United States Patent
Lee et al.

(10) Patent No.: US 10,380,378 B2
(45) Date of Patent: Aug. 13, 2019

(54) APPARATUS AND METHOD FOR PROTECTING INFORMATION IN COMMUNICATION SYSTEM

(71) Applicant: Samsung Electronics Co., Ltd., Suwon-si, Gyeonggi-do (KR)

(72) Inventors: Bo-Young Lee, Seoul (KR); Sung-Kee Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 111 days.

(21) Appl. No.: 15/216,947

(22) Filed: Jul. 22, 2016

(65) Prior Publication Data

US 2017/0091484 A1    Mar. 30, 2017

(30) Foreign Application Priority Data

Sep. 24, 2015  (KR) .................. 10-2015-0135491

(51) Int. Cl.
*G06F 21/56* (2013.01)
*G06F 21/62* (2013.01)
*G06F 16/951* (2019.01)
*G06F 21/57* (2013.01)
(Continued)

(52) U.S. Cl.
CPC ........ *G06F 21/6245* (2013.01); *G06F 16/951* (2019.01); *G06F 21/554* (2013.01); *G06F 21/566* (2013.01); *G06F 21/577* (2013.01); *G06F 21/6218* (2013.01); *G06F 21/6281* (2013.01); *H04L 63/04* (2013.01); *H04L 63/145* (2013.01); *H04L 63/1408* (2013.01); *H04L 63/1416* (2013.01); *H04L 63/1433* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 8,499,170 | B1 * | 7/2013 | Tongshu | G06F 21/54 713/193 |
| 8,533,844 | B2 * | 9/2013 | Mahaffey | G06F 21/564 709/203 |
| 9,652,617 | B1 * | 5/2017 | Evans | G06F 21/57 |

(Continued)

FOREIGN PATENT DOCUMENTS

| | | |
|---|---|---|
| CN | 102810143 A | 12/2012 |
| KR | 10-2012-0084184 A | 7/2012 |

(Continued)

*Primary Examiner* — Malcolm Cribbs
(74) *Attorney, Agent, or Firm* — Jefferson IP Law, LLP

(57) ABSTRACT

The present disclosure relates to a sensor network, machine type communication (MTC), machine-to-machine (M2M) communication, and technology for internet of things (IoT). The present disclosure may be applied to intelligent services based on the above technologies, such as smart home, smart building, smart city, smart car, connected car, health care, digital education, smart retail, security and safety services. A method, communication device, and server for protecting information in a communication device in a communication system are provided. The method includes acquiring a database security analysis result for an application (App) upon detecting that the App is run, and outputting the database security analysis result for the App.

12 Claims, 21 Drawing Sheets

(51) Int. Cl.
*H04L 29/06* (2006.01)
*G06F 21/55* (2013.01)

(56) References Cited

U.S. PATENT DOCUMENTS

| | | | | |
|---|---|---|---|---|
| 2005/0223239 | A1* | 10/2005 | Dotan | G06F 21/52 |
| | | | | 713/188 |
| 2006/0031938 | A1* | 2/2006 | Choi | G06F 21/552 |
| | | | | 726/25 |
| 2008/0034425 | A1* | 2/2008 | Overcash | G06F 21/55 |
| | | | | 726/22 |
| 2008/0109871 | A1* | 5/2008 | Jacobs | H04L 63/20 |
| | | | | 726/1 |
| 2011/0066680 | A1* | 3/2011 | Handa | G06F 21/51 |
| | | | | 709/203 |
| 2011/0072030 | A1* | 3/2011 | Wong | G06F 17/30289 |
| | | | | 707/759 |
| 2013/0062401 | A1* | 3/2013 | Sheehan | G06F 9/468 |
| | | | | 235/375 |
| 2013/0117846 | A1* | 5/2013 | Mahaffey | G06F 21/564 |
| | | | | 726/22 |
| 2014/0137255 | A1* | 5/2014 | Wang | G06F 21/566 |
| | | | | 726/24 |
| 2014/0245448 | A1 | 8/2014 | Moon et al. | |
| 2015/0033342 | A1* | 1/2015 | Zhang | G06F 21/563 |
| | | | | 726/23 |
| 2015/0067830 | A1 | 3/2015 | Johansson et al. | |
| 2015/0163668 | A1 | 6/2015 | Wu et al. | |
| 2015/0324468 | A1* | 11/2015 | Okamoto | G06F 17/30867 |
| | | | | 707/706 |
| 2015/0379268 | A1* | 12/2015 | Singh | G06F 21/566 |
| | | | | 726/23 |
| 2016/0007387 | A1* | 1/2016 | Adib | H04W 4/21 |
| | | | | 370/329 |
| 2016/0063244 | A1* | 3/2016 | Zhang | H04N 21/44008 |
| | | | | 726/23 |

FOREIGN PATENT DOCUMENTS

| | | |
|---|---|---|
| KR | 10-2012-0090160 A | 8/2012 |
| KR | 10-2013-0109560 A | 10/2013 |
| KR | 10-1414084 B1 | 7/2014 |

* cited by examiner

APPARATUS AND METHOD FOR PROTECTING INFORMATION IN COMMUNICATION SYSTEM

CROSS-REFERENCE TO RELATED APPLICATION(S)

This application claims the benefit under 35 U.S.C. § 119(a) of a Korean patent application filed in the Korean Intellectual Property Office on Sep. 24, 2015 assigned serial number 10-2015-0135491, the entire disclosure of which is hereby incorporated by reference.

TECHNICAL FIELD

The present disclosure relates to an apparatus and method for protecting information in a communication system. More particularly, the present disclosure relates to an apparatus and method for protecting information based on a database security analysis result for an application (App) in a communication system.

BACKGROUND

The Internet, which is a human centered connectivity network where humans generate and consume information, is now evolving to an internet of things (IoT) where distributed entities, such as things, exchange and process information without human intervention. In addition, an internet of everything (IoE), which is a combination of the IoT technology and big data processing technology through connection with a cloud server, has emerged.

As technology elements, such as "sensing technology," "wired/wireless communication and network infrastructure," "service interface technology," and "security technology" have been demanded for IoT implementation, a sensor network, a machine-to-machine (M2M) communication, machine type communication (MTC), and so forth have been recently researched.

An IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances, and advanced medical services through convergence and combination between existing information technology (IT) and various industrial applications.

Various user information may be stored at a storage included in a communication device such as a smart phone, a tablet, a smart watch, a smart band, a smart necklace, and a smart ring and managed while the communication device is used. The various user information may include personal information such as system preferences, a searching record, an alarm, a Wi-Fi list, a picture, an image file, a contact list, call history, a text message, schedule, an e-mail, and the like. Further, the various user information may be stored at the storage with a database form. For convenience, a database (DB) within a storage included in a communication device in which personal information is stored will be referred to as personal information database within device (PIDBD).

Meanwhile, each of various applications (Apps), which are installed on the communication device, may request an access to the PIDBD to acquire personal information in order to provide a related service.

Alternatively, each of the Apps may store and manage personal information by directly generating a DB. Here, a DB generated in an App may be easily attacked by various external risks, such as a malicious App, a malicious code, loss of a device, a looted device, and the like, when compared to a PIDBD, which is managed at a system level. As such, there is a high probability that a security incident, such as a leak of personal information, will occur.

Therefore, many users use several Apps to implement various security policies, such as database encryption, and the like, in order to prevent a security incident. However, such security policies may have a significant load due to the development for an App in which a database security solution is applied to the App on the development for the App. Therefore, a database security policy is currently not applied to most of Apps registered at an App market.

Currently, in a communication device, there is no scheme of checking how personal information is safely managed on Apps installed on the communication device.

An example of a method of protecting personal information by detecting a malicious App in a communication device in a communication system will be described with reference to FIG. 1.

FIG. 1 schematically illustrates an example of a method of protecting personal information by detecting a malicious App in a communication device in a communication system, according to the related art.

Referring to FIG. 1, if an App, e.g., ANDROIDMANI-FEST.XML, is installed on a communication device through an App package file, e.g., an Android App package (APK) file, the communication device performs a security scanning process and a code static analyzing process on the App to determine whether the App is a malicious App. The communication device extracts an authority related file from the App and analyzes the extracted authority related file to determine whether the App is a malicious App.

As described in FIG. 1, if an App is installed on a communication device, the communication device may detect whether the installed App is a malicious App. If the installed App is a new malicious App, which is not known, it may be impossible to prevent a leak of personal information due to various external risks.

An example of a method of protecting personal information by detecting a malicious App in a communication device in a communication system has been described with reference to FIG. 1, and another example of a method of protecting personal information by detecting a malicious App in a communication device in a communication system will be described with reference to FIG. 2.

FIG. 2 schematically illustrates another example of a method of protecting personal information by detecting a malicious App in a communication device in a communication system, according to the related art.

Referring to FIG. 2, as described in FIG. 1, if an App is installed on a communication device through an App package file, e.g., an APK file, the communication device performs a security scanning process and a code static analyzing process on the App to determine whether the App is a malicious App.

Even though the App is a malicious App, there may be limitations on preventing a leak of personal information which may occur due to various external risks such as a malicious App, a malware, loss of a device, a looted device, and the like.

Accordingly, there is a need for a method for safely protecting personal information managed in an App which is installed on a communication device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for protecting information in a communication system.

Another aspect of the present disclosure is to provide an apparatus and method for protecting information based on a database security analysis result for an application (App) in a communication system.

Another aspect of the present disclosure is to provide an apparatus and method for dynamically protecting information based on a database security analysis result for an App in a server in a communication system.

Another aspect of the present disclosure is to provide an apparatus and method for dynamically protecting information based on a database security analysis result for an App in a communication device in a communication system.

Another aspect of the present disclosure is to provide an apparatus and method for protecting information thereby security for a database within application (DBA) is enhanced per App in a communication system.

Another aspect of the present disclosure is to provide an apparatus and method for protecting information based on a database security analysis result for an App according to security preferences in a communication system.

In accordance with an aspect of the present disclosure, a method for protecting information in a communication device in a communication system is provided. The method includes acquiring a database security analysis result for an App upon detecting that the App is run, and outputting the database security analysis result for the App.

In accordance with another aspect of the present disclosure, a method for protecting information in a server in a communication system is provided. The method includes receiving a database security analysis request message, which requests a database security analysis result for an App, from a communication device, and transmitting a database security analysis result response message to the communication device based on whether the database security analysis result for the App is stored.

In accordance with another aspect of the present disclosure, a communication device in a communication system is provided. The communication device includes a processor configured to acquire a database security analysis result for an App upon detecting that the App is run, and output the database security analysis result for the App.

In accordance with another aspect of the present disclosure, a server in a communication system is provided. The server includes a receiver configured to receive a database security analysis request message, which requests a database security analysis result for an App, from a communication device, and a transmitter configured to transmit a database security analysis result response message to the communication device based on whether the database security analysis result for the App is stored.

Other aspects, advantages, and salient features of the disclosure will become apparent to those skilled in the art from the following detailed description, which, taken in conjunction with the annexed drawings, discloses various embodiments of the present disclosure.

Before undertaking the detailed description below, it may be advantageous to set forth definitions of certain words and phrases used throughout this patent document: the terms "include" and "comprise," as well as derivatives thereof, mean inclusion without limitation, the term "or," is inclusive, meaning and/or, the phrases "associated with" and "associated therewith, "as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like, and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
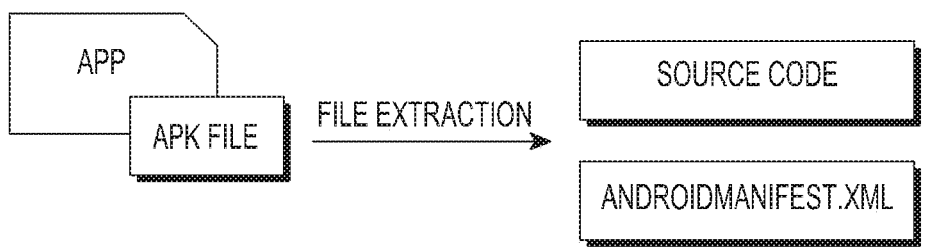
FIG. 1 schematically illustrates an example of a method of protecting personal information by detecting a malicious application (App) in a communication device in a communication system according to the related art.
Figure 2:
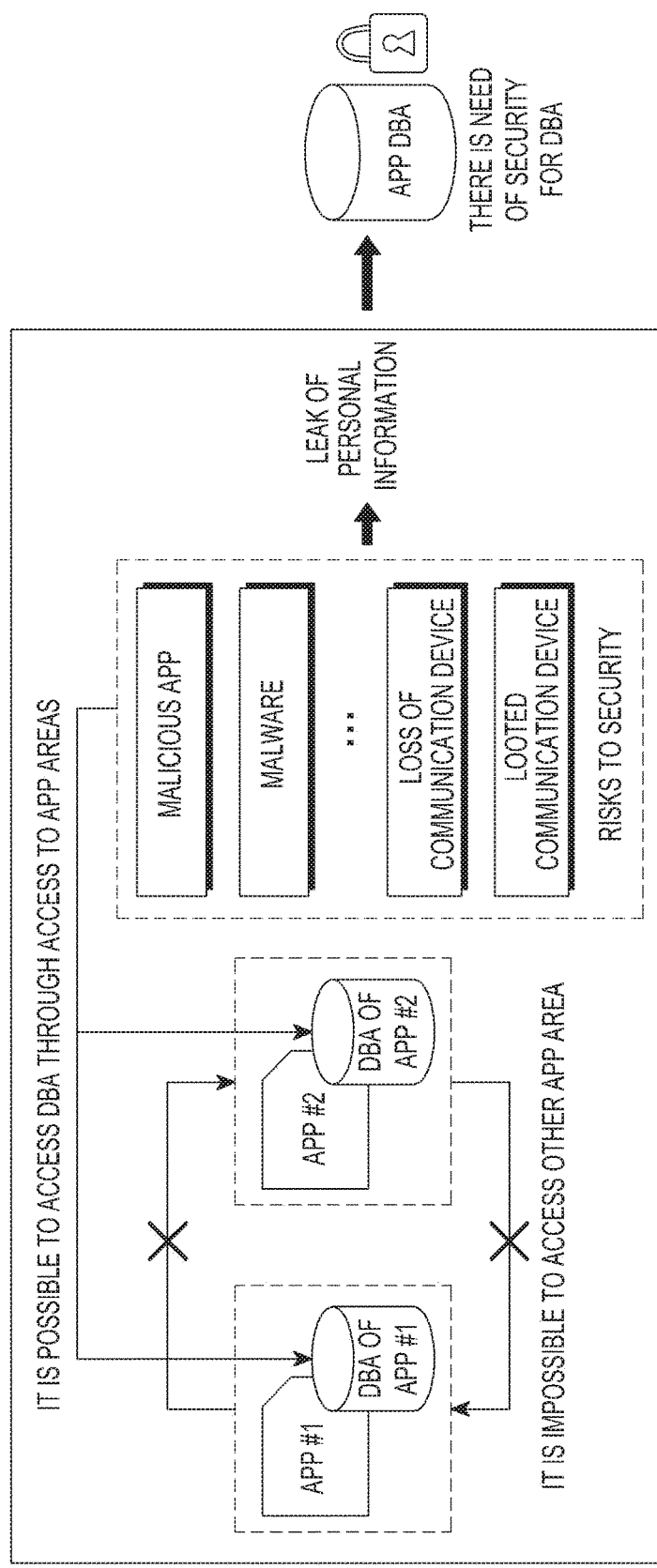
FIG. 2 schematically illustrates another example of a method of protecting personal information by detecting a malicious App in a communication device in a communication system according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, operation, component, element, or combination thereof, but do not preclude the presence or addition of one or more other features, numbers, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), a motion picture experts group (MPEG)-1 or -2 audio layer III (mp3) player, a mobile medical device, a camera, a wearable device (e.g., a head-mounted device (HMD), electronic clothes, electronic braces, an electronic necklace, an electronic accessory, an electronic tattoo, or a smart watch), and/or the like.

According to various embodiments of the present disclosure, an electronic device may be a smart home appliance with communication functionality. A smart home appliance may be, for example, a television, a digital versatile disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, an electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

An embodiment of the present disclosure provides an apparatus and method for protecting information in a communication system.

An embodiment of the present disclosure provides an apparatus and method for protecting information based on a database security analysis result for an application (App) in a communication system.

An embodiment of the present disclosure provides an apparatus and method for dynamically protecting information based on a database security analysis result for an App in a server in a communication system.

An embodiment of the present disclosure provides an apparatus and method for dynamically protecting information based on a database security analysis result for an App in a communication device in a communication system.

An embodiment of the present disclosure provides an apparatus and method for protecting information thereby security for a database within application (DBA) is enhanced per App in a communication system.

An embodiment of the present disclosure provides an apparatus and method for protecting information based on a database security analysis result for an App according to security preferences in a communication system.

A method and apparatus of various embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a 3rdgeneration project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile internet protocol (Mobile IP) system and/or the like.

A structure of a communication system according to an embodiment of the present disclosure will be described with reference to FIG. 3.

Figure 3:
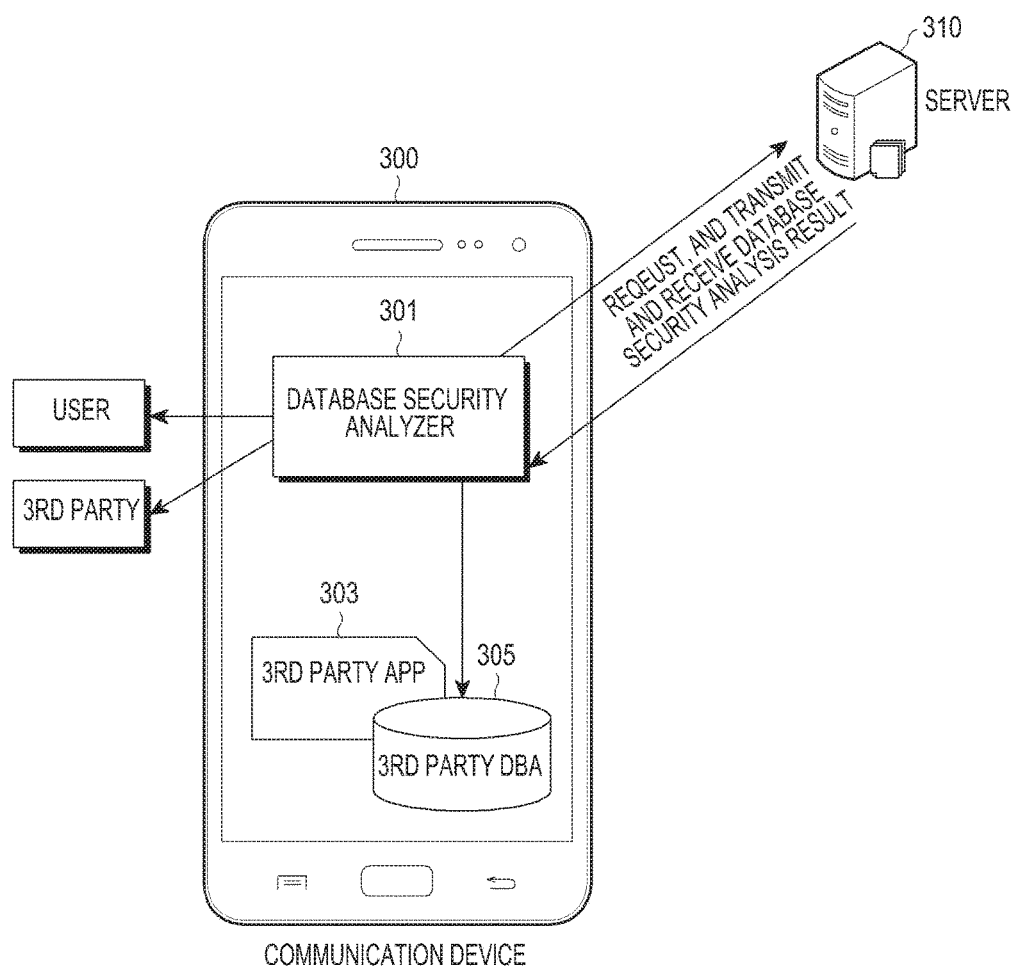
FIG. 3 schematically illustrates a communication system according to an embodiment of the present disclosure.

FIG. 3 schematically illustrates a communication system according to an embodiment of the present disclosure.

Referring to FIG. 3, the communication system includes a communication device 300 and a server 310. The communication device 300 includes a database security analyzer 301.

If a 3rd party App 303 is installed on the communication device 300, the 3rd party App 303 generates and manages a 3rd party database within application (DBA) 305 which stores information related to running the 3rd party App 303, e.g., personal information such as system preferences, a searching record, an alarm, a Wi-Fi list, a picture, an image file, contact information, call history, a text message, a schedule, an e-mail, and the like.

The database security analyzer 301 analyzes a 3rd party App database, which is installed on the communication device 300 and which at least one 3rd party App manages, and an analysis result thereof is transmitted to the server 310.

The server 310 checks a security level for a 3rd party App database of each of at least one 3rd party App, which is installed on the communication device 300, based on the analysis result which is received from the database security analyzer 301 included in the communication device 300. The server 310 provides a security solution for a 3rd party App database to a user of the communication device 300 or a 3rd party based on the analysis result which is received from the database security analyzer 301 included in the communication device 300. That is, the server 310 manages an App database security analysis result per App, which is received from the communication device 300, or provides a stored App database security analysis result per App to the communication device 300.

A structure of a communication system according to an embodiment of the present disclosure has been described with reference to FIG. 3, and an operating process of communication devices in a case that a security policy for a database, which each 3rd party App manages, is equally applied to all of the communication devices in a communication system according to an embodiment of the present disclosure will be described with reference to FIG. 4.

Figure 4:
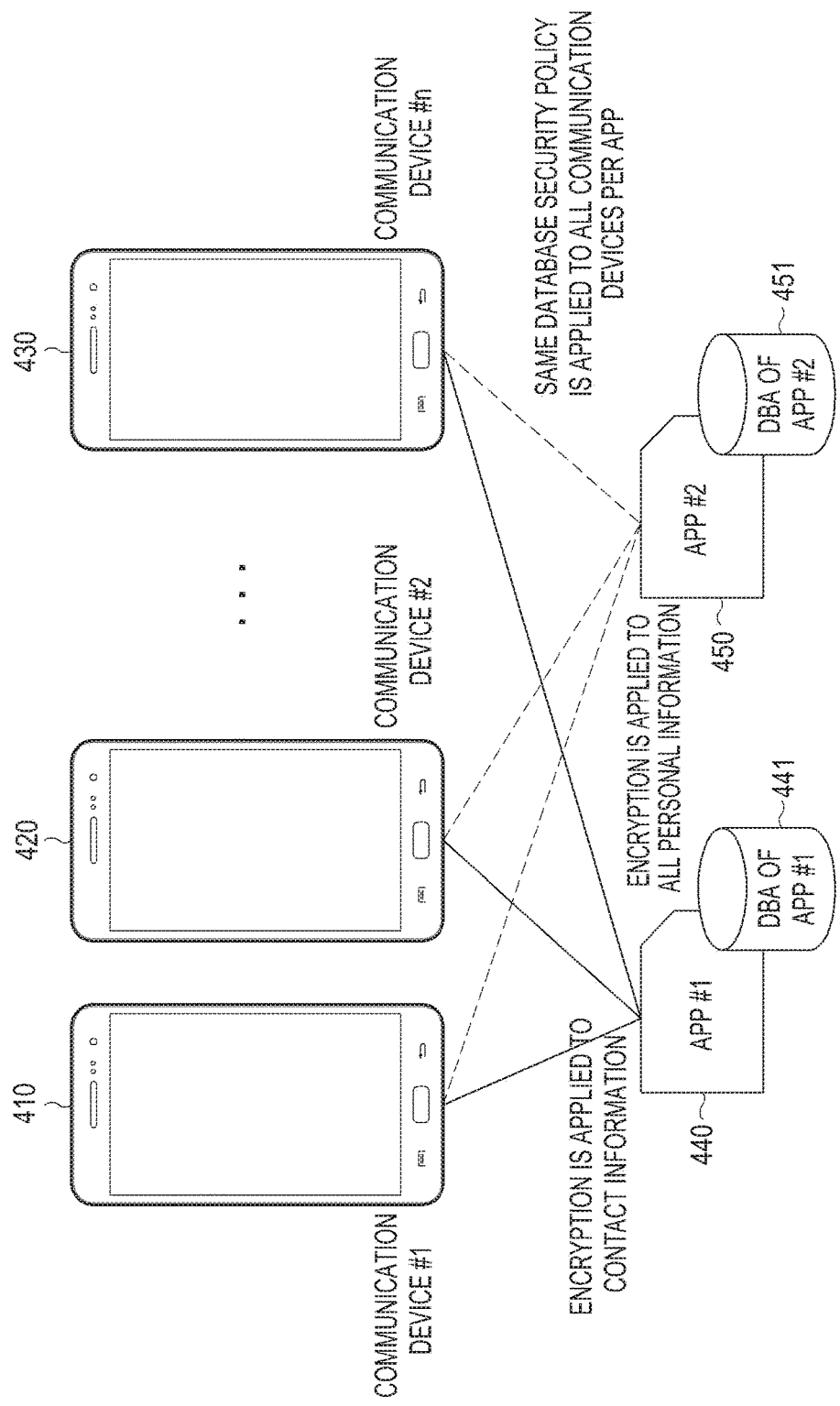
FIG. 4 schematically illustrates an operating process of communication devices in a case that a security policy for a DB, which each 3rd party App manages, is equally applied to all of the communication devices in a communication system according to an embodiment of the present disclosure.

FIG. 4 schematically illustrates an operating process of communication devices in a case that a security policy for a database, which each 3rd party App manages, is equally applied to all of the communication devices in a communication system according to an embodiment of the present disclosure.

Referring to FIG. 4, it will be noted that an operating process of communication devices in FIG. 4 is an operating process of communication devices in a case that a plurality of Apps, e.g., a 3rd party App #1 440 and a 3rd party App #2 450, are installed on each of a plurality of communication devices, e.g., n communication devices, e.g., a communication device #1 410, a communication device #2 420, . . . , and a communication device #n 430, and the same database security policy is applied to the communication devices on which each of the 3rd party App #1 440 and the 3rd party App #2 450 is installed.

In FIG. 4, it will be assumed that encryption is applied to contact information among information which is stored in a database 441 for the 3rd party App #1 440, and encryption is applied to all personal information among information which is stored in a database 451 for the 3rd party App #2 450.

Database security analysis for each of the 3rd party App #1 440 and the 3rd party App #2 450 is performed in a server (not shown in FIG. 4), or is performed in each of the communication device #1 410, the communication device #2 420, and the communication device #n 430, and a database security analysis result is managed in the server.

An operation of storing the database security analysis result for the 3rd party Apps in the server will be described below.

The server stores and manages App information and a database security analysis result per 3rd party App. Here, the App information may include an App name, a package name, App developer information, version information, update information, and the like. The database security analysis result may indicate whether a database is generated, a type of personal information which is managed in a database, whether encryption is applied to a database, and the like.

Meanwhile, if a version for an App of which a database security analysis result is registered at the server is updated in an App market, a database security analyzing operation is performed on the updated App in the server or related communication devices again, and a database security analysis result is stored in the server. In FIG. 4, the database security analyzing operation is performed again if the version of the App is updated, however, the database security analyzing operation may be performed again whenever a change occurs in the database security analysis for the App as well as when the version update occurs.

An operating process of communication devices in a case that a security policy for a database, which each 3rd party App manages, is equally applied to all of the communication devices in a communication system according to an embodiment of the present disclosure has been described with reference to FIG. 4, and a process of transmitting and receiving a message between a communication device and a server in a case that a database security analysis result for an App is stored in the server in a communication system according to an embodiment of the present disclosure will be described with reference to FIG. 5.

Figure 5:
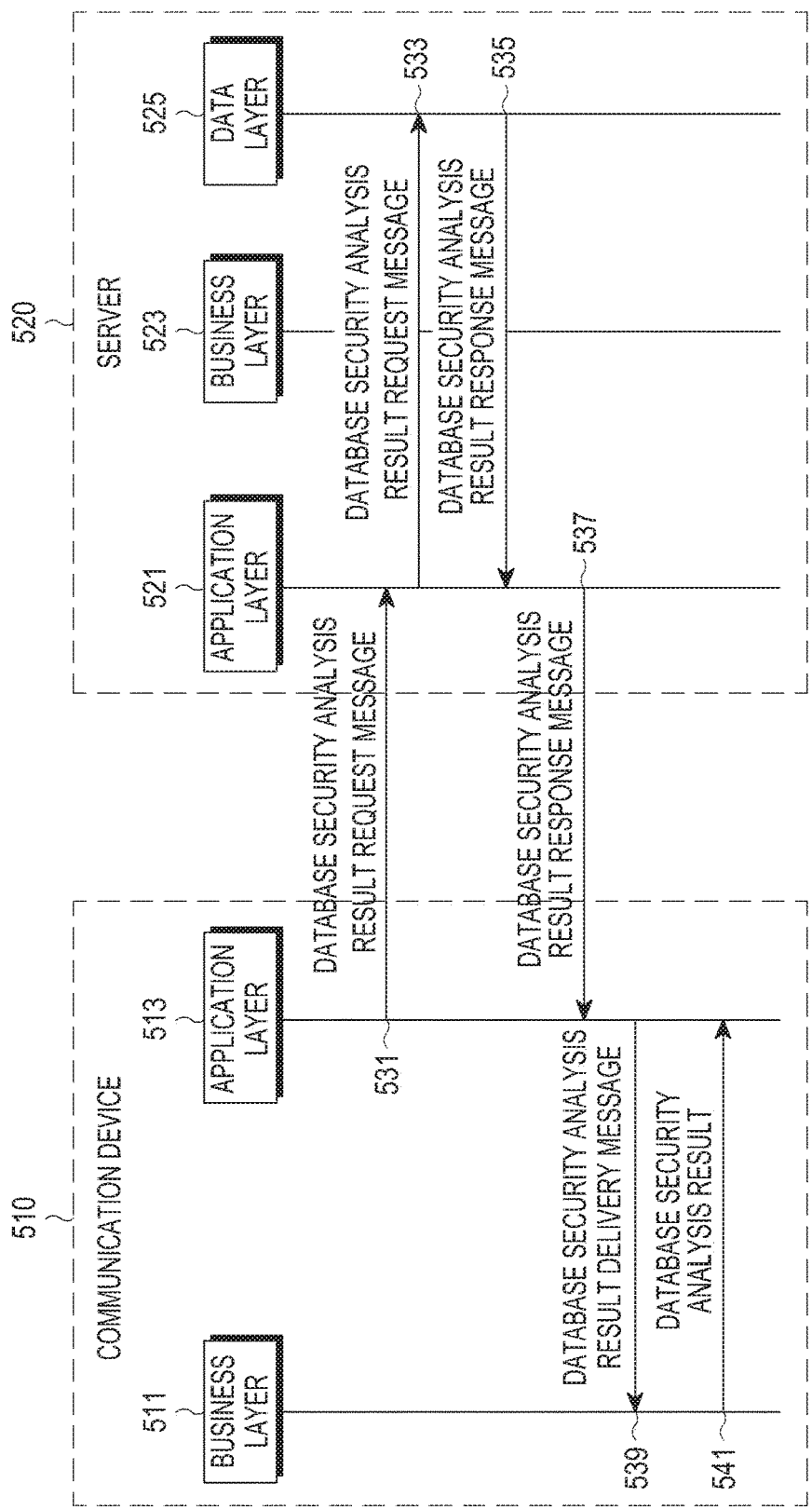
FIG. 5 schematically illustrates a process of transmitting and receiving a message between a communication device and a server in a case that a database security analysis result for an App is stored in the server in a communication system according to an embodiment of the present disclosure.

FIG. 5 schematically illustrates a process of transmitting and receiving a message between a communication device and a server in a case that a database security analysis result for an App is stored in the server in a communication system according to an embodiment of the present disclosure.

Referring to FIG. 5, the communication system includes a communication device 510 and a server 520.

The communication device 510 includes a business layer 511 and an App layer 513. The business layer 511 may be an App framework.

The server 520 includes an App layer 521, a business layer 523, and a data layer 525.

When an App is initially run after the App is installed in the communication device 510, the App layer 513 in the communication device 510 transmits a database security analysis result request message, which requests a database security analysis result, to the App layer 521 in the server 520 at operation 531.

After receiving the database security analysis result request message from the App layer 513 in the communication device 510, the App layer 521 in the server 520 transfers database security analysis result query to the data layer 525 in the server 520 at operation 533. After receiving the database security analysis result query from the App layer 521 in the server 520, the data layer 525 in the server 520 determines whether the data layer 525 in the server 520 stores a database security analysis result for an App corresponding to the database security analysis result query.

If the data layer 525 in the server 520 stores the database security analysis result, the data layer 525 in the server 520 transfers a database security analysis result message, which includes the database security analysis result which the data layer 525 in the server 520 stores, to the App layer 521 in the server 520 at operation 535. After receiving the database security analysis result message from the data layer 525 in the server 520, the App layer 521 in the server 520 transmits a database security analysis result response message, which includes the database security analysis result, to the App layer 513 in the communication device 510 at operation 537.

After receiving the database security analysis result response message from the App layer 521 in the server 520, the App layer 513 in the communication device 510 transfers a database security analysis result delivery message, which includes the database security analysis result, to the business layer 511 in the communication device 510 at operation 539. After receiving the database security analysis result delivery message from the App layer 513 in the communication device 510, the business layer 511 in the communication device 510 transfers the database security analysis result to the App layer 513 in the communication device 510 at operation 541.

As described in FIG. 5, it will be understood that a communication device may use a database security analysis result received from a server without performing a database security analyzing operation for an App upon initially running the App.

Although FIG. 5 illustrates a process of transmitting and receiving a message between a communication device and a server in a case that a database security analysis result for an App is stored in the server in a communication device according to an embodiment of the present disclosure, various changes could be made to FIG. 5. For example, although shown as a series of operations, various operations in FIG. 5 could overlap, occur in parallel, occur in a different order, or occur multiple times.

A process of transmitting and receiving a message between a communication device and a server in a case that a database security analysis result for an App is stored in the server in a communication system according to an embodiment of the present disclosure has been described with reference to FIG. 5, and a process of transmitting and receiving a message between a communication device and a server in a case that a database security analysis result for an App is not stored in the server in a communication system according to an embodiment of the present disclosure will be described with reference to FIG. 6.

Figure 6:
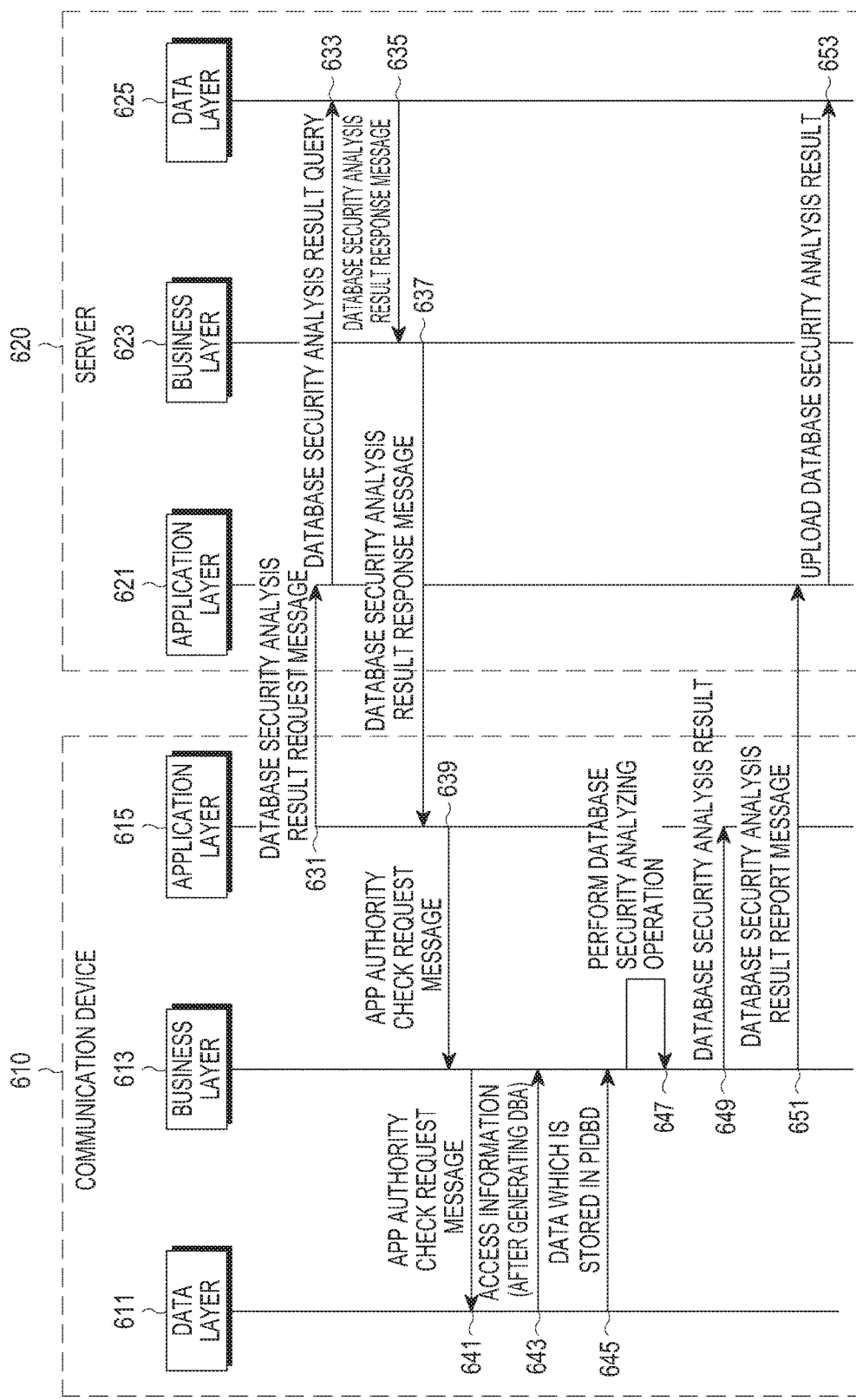
FIG. 6 schematically illustrates a process of transmitting and receiving a message between a communication device and a server in a case that a database security analysis result for an App is not stored in the server in a communication system according to an embodiment of the present disclosure.

FIG. 6 schematically illustrates a process of transmitting and receiving a message between a communication device and a server in a case that a database security analysis result for an App is not stored in the server in a communication system according to an embodiment of the present disclosure.

Referring to FIG. 6, the communication system includes a communication device 610 and a server 620.

The communication device 610 includes a data layer 611, a business layer 613 and an App layer 615. The business layer 613 may be an App framework.

The server 620 includes an App layer 621, a business layer 623, and a data layer 625.

When an App is initially run after the App is installed in the communication device 610, the App layer 615 in the communication device 610 transmits a database security analysis result request message, which requests a database security analysis result, to the App layer 621 in the server 620 at operation 631.

After receiving the database security analysis result request message from the App layer 615 in the communication device 610, the App layer 621 in the server 620 transfers database security analysis result query to the data layer 625 in the server 620 at operation 633. After receiving the database security analysis result query from the App layer 621 in the server 620, the data layer 625 in the server 620 determines whether the data layer 625 in the server 620 stores a database security analysis result for an App corresponding to the database security analysis result query.

If the data layer 625 in the server 620 does not store the database security analysis result, the data layer 625 in the server 620 transmits a database security analysis result response message, which indicates that there is no database security analysis result, to the business layer 623 in the server 620 at operation 635. Upon receiving the database security analysis result response message from the data layer 625 in the server 620, the business layer 623 in the server 620 transmits a database security analysis result response message, which indicates that there is no database security analysis result, to the App layer 615 in the communication device 610 at operation 637.

Upon receiving the database security analysis result response message from the business layer 623 in the server 620, the App layer 615 in the communication device 610 transfers an App authority check request message, which requests an authority for the installed App, to the business layer 613 in the communication device 610 at operation 639. Upon receiving the App authority check request message from the App layer 615 in the communication device 610, the business layer 613 in the communication device 610 transfers an App authority check request message, which requests an authority for the installed App, to the data layer 611 in the communication device 610 at operation 641.

Upon receiving the App authority check request message from the business layer 613 in the communication device 610, the data layer 611 in the communication device 610 generates a database for the installed App and detects access information to transfer the access information to the business layer 613 in the communication device 610 at operation 643. The data layer 611 in the communication device 610 transfers data, which is stored in a personal information database within device (PIDBD) which the communication device 610 manages, to the business layer 613 in the communication device 610 at operation 645. Here, the PIDBD denotes a database in which personal information, which is stored in a storage included in the communication device 610, is stored.

Upon receiving the data which is stored in the PIDBD, the business layer 613 in the communication device 610 performs a database security analyzing operation for the data which is stored in the PIDBD at operation 647, and transfers a database security analysis result, which is acquired according to the database security analyzing operation, to the App layer 615 in the communication device 610 at operation 649. The business layer 613 in the communication device 610 transmits a database security analysis result report message, which includes the database security analysis result, to the App layer 621 in the server 620 at operation 651.

Upon receiving the database security analysis result report message from the business layer 613 in the communication device 610, the App layer 621 in the server 620 uploads the database security analysis result to the data layer 625 in the server 620 at operation 653.

As described in FIG. 6, it will be understood that a communication device may perform a database security analyzing operation to upload a database security analysis result to a server if there is no database security analysis result in a server when the communication device initially runs the App.

Although FIG. 6 illustrates a process of transmitting and receiving a message between a communication device and a server in a case that a database security analysis result for an App is not stored in the server in a communication system according to an embodiment of the present disclosure, various changes could be made to FIG. 6. For example, although shown as a series of operations, various operations in FIG. 6 could overlap, occur in parallel, occur in a different order, or occur multiple times.

A process of transmitting and receiving a message between a communication device and a server in a case that a database security analysis result for an App is not stored in the server in a communication system according to an embodiment of the present disclosure has been described with reference to FIG. 6, and a process of transmitting and receiving a message between a communication device and a server in a case that a database security analyzing operation for an App is performed in the server in a communication system according to an embodiment of the present disclosure will be described with reference to FIG. 7.

Figure 7:
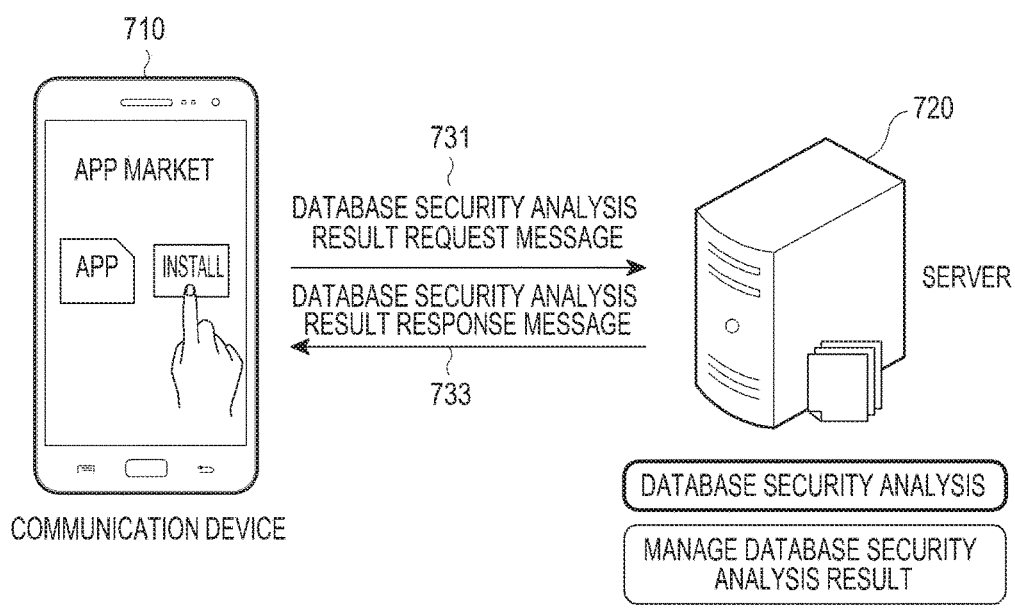
FIG. 7 schematically illustrates a process of transmitting and receiving a message between a communication device and a server in a case that a database security analyzing operation for an App is performed in the server in a communication system according to an embodiment of the present disclosure.

FIG. 7 schematically illustrates a process of transmitting and receiving a message between a communication device and a server in a case that a database security analyzing operation for an App is performed in the server in a communication system according to an embodiment of the present disclosure.

Referring to FIG. 7, a server 720 performs a database security analyzing operation for all Apps, which are registered at an App market, and stores and manages a database security analysis result according to the database security analyzing operation.

Upon installing a specific App, a communication device 710 transmits a database security analysis result request message, which requests to transmit a database security analysis result, to the server 720 at operation 731. The server 720 transmits a database security analysis result response message, which includes a database security analysis result for the App which the server 720 stores, to the communication device 710 at operation 733.

A process of transmitting and receiving a message between a communication device and a server in a case that a database security analyzing operation for an App is performed in the server in a communication system according to an embodiment of the present disclosure has been described with reference to FIG. 7, and an operating process of a communication device in a case that the communication device receives a database security analysis result for an App from a server before installing the App in a communication system according to an embodiment of the present disclosure will be described with reference to FIG. 8.

Figure 8:
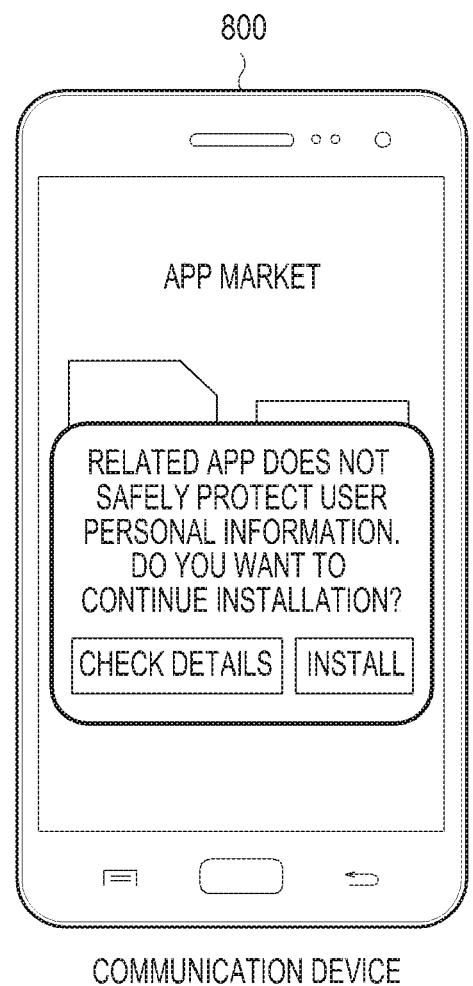
FIG. 8 schematically illustrates an operating process of a communication device in a case that the communication device receives a database security analysis result for an App from a server before installing the App in a communication system according to an embodiment of the present disclosure.

FIG. 8 schematically illustrates an operating process of a communication device in a case that the communication device receives a database security analysis result for an App from a server before installing the App in a communication system according to an embodiment of the present disclosure.

Referring to FIG. 8, a server (not shown in FIG. 8) performs a database security analyzing operation for all Apps, which are registered at an App market, and stores a database security analysis result after completing the database security analyzing operation.

Upon detecting that a specific App needs to be installed, a communication device 800 transmits a database security analysis result request message, which requests a database security analysis result for the specific App, to the server. After receiving the database security analysis result from the communication device 800, the server determines whether the database security analysis result for the specific App has been stored at the server. If the database security analysis result for the specific App has been stored, the server transmits the database security analysis result for the specific App to the communication device 800.

The communication device 800 receives the database security analysis result for the specific App from the server, and outputs the received the database security analysis result. The communication device 800 outputs the received the database security analysis result, e.g., "Related App does not safely protect user personal information. Do you want to continue installation?" on a display, e.g., a touch screen included in the communication device 800.

The communication device 800 outputs the database security analysis result for the specific App which the communication device 800 intends to install on a display thereby allowing a user to determine whether to install the specific App based on the database security analysis result for the specific App.

If the database security analysis result for the specific App is not stored in the server, the server transmits a database security analysis result response message, which indicates that the database security analysis result is not stored, to the communication device 800.

Since the database security analysis result for the specific App is not stored in the server, the server registers an App identifier (ID) of the specific App at a database security analysis list, which the server manages, and performs a database security analyzing operation for the specific App.

Since the database security analysis result for the specific App is not stored at the server, the communication device 800 installs the specific App.

After completing the database security analyzing operation for the specific App, the server transmits a database security analysis result for the specific App to the communication device 800. The communication device 800 receives the database security analysis result for the specific App and performs a related operation such as an operation of outputting the database security analysis result for the specific App, and the like.

An operating process of a communication device in a case that the communication device receives a database security analysis result for an App from a server before installing the App in a communication system according to an embodiment of the present disclosure has been described with reference to FIG. 8, and a process of transmitting and receiving a message between a communication device and a server in a case that a database security analyzing operation for an App is performed in the communication device and the server in a communication system according to an embodiment of the present disclosure will be described with reference to FIG. 9.

Figure 9:
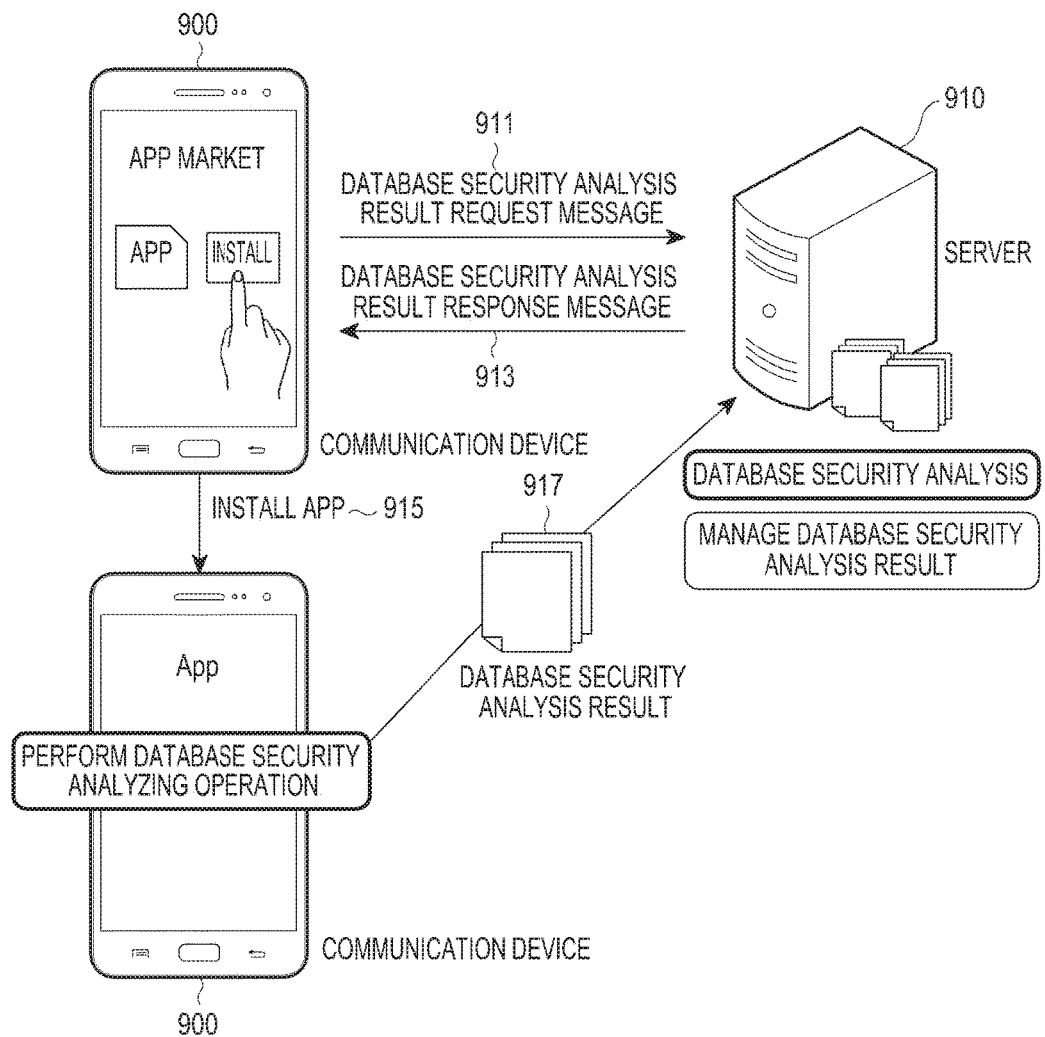
FIG. 9 schematically illustrates a process of transmitting and receiving a message between a communication device and a server in a case that a database security analyzing operation for an App is performed in the communication device and the server in a communication system according to an embodiment of the present disclosure.

FIG. 9 schematically illustrates a process of transmitting and receiving a message between a communication device and a server in a case that a database security analyzing operation for an App is performed in the communication device and the server in a communication system according to an embodiment of the present disclosure.

Referring to FIG. 9, a server 910 performs a database security analyzing operation for all Apps registered at an App market and stores a database security analysis result after completing the database security analyzing operation.

Upon detecting that there is a need for installing a specific App, a communication device 900 transmits a database security analysis result request message, which requests a database security analysis result for the specific App, to the server 910 at operation 911.

If the database security analysis result for the specific App is stored, the server 910 transmits the database security analysis result for the specific App to the communication device 900.

The communication device 900 receives the database security analysis result for the specific App from the server 910, and outputs the received database security analysis result. Here, the communication device 900 outputs the received database security analysis result, e.g., "Related App does not safely protect user personal information. Do you want to continue installation?" on a display, e.g., a touch screen, included in the communication device 900.

The communication device 900 outputs the database security analysis result for the specific App which the communication device 900 intends to install, so that a user may determine whether to install the specific App by considering the database security analysis result for the specific App.

If the database security analysis result for the specific App is not stored, the server 910 transmits a database security analysis result response message, which indicates that the database security analysis result for the specific App is not stored, to the communication device 900 at operation 913.

After receiving the database security analysis result response message from the server 910, the communication device 900 installs the specific App since the database security analysis result for the specific App is not stored in the server 910 at operation 915. The communication device 900 performs a database security analyzing operation for the specific App and transmits a database security analysis result for the specific App to the server 910 after completing the database security analyzing operation at operation 917.

The server 910 receives the database security analysis result for the specific App from the communication device 900 and stores the database security analysis result for the specific App.

A process of transmitting and receiving a message between a communication device and a server in a case that a database security analyzing operation for an App is performed in the communication device and the server in a communication system according to an embodiment of the present disclosure has been described with reference to FIG. 9, and a process of transmitting and receiving a message between a communication device and a server in a case that a database security analyzing operation for an App is performed in the communication device in a communication system according to an embodiment of the present disclosure will be described with reference to FIG. 10.

Figure 10:
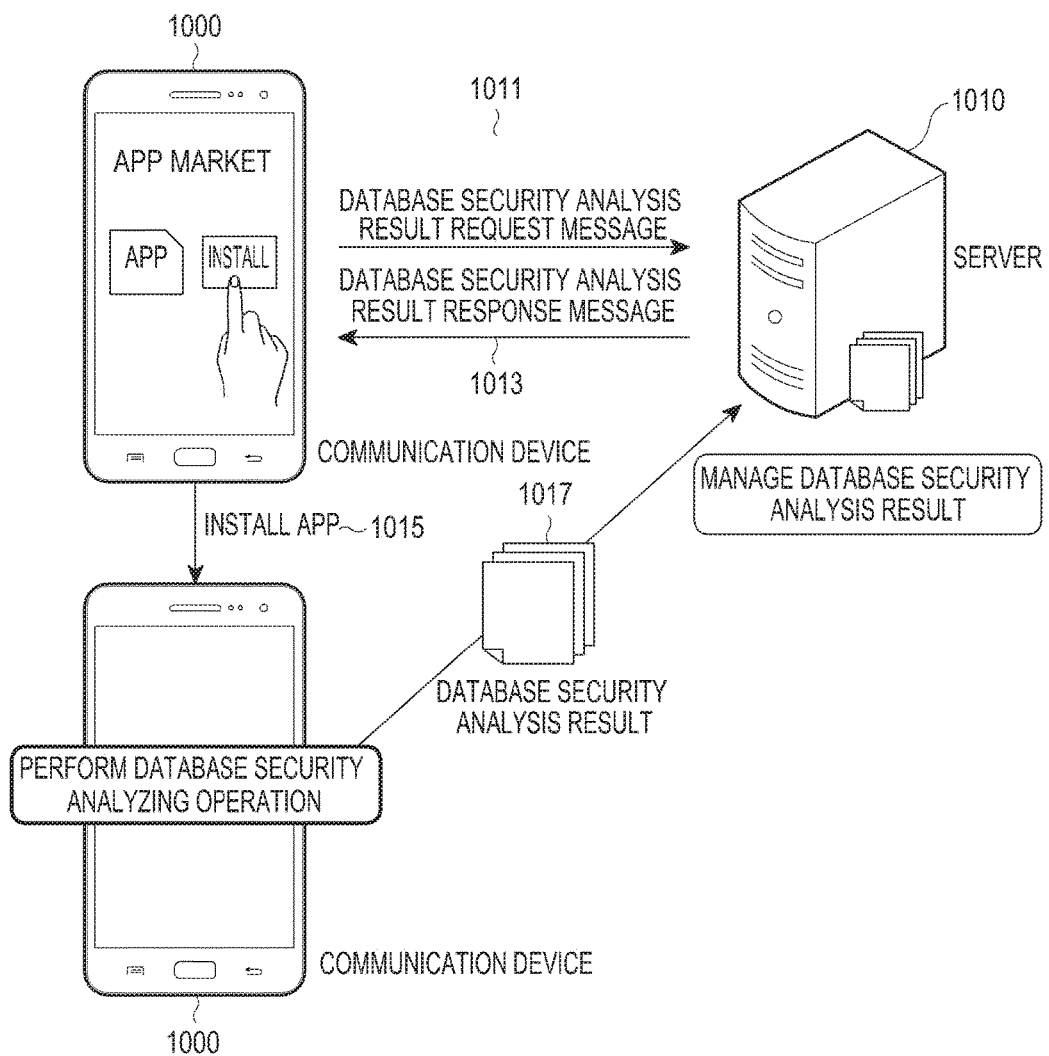
FIG. 10 schematically illustrates a process of transmitting and receiving a message between a communication device and a server in a case that a database security analyzing operation for an App is performed in the communication device in a communication system according to an embodiment of the present disclosure.

FIG. 10 schematically illustrates a process of transmitting and receiving a message between a communication device and a server in a case that a database security analyzing operation for an App is performed in the communication device in a communication system according to an embodiment of the present disclosure.

Referring to FIG. 10, a server 1010 does not perform a database security analyzing operation for Apps. Rather, the server 1010 stores only database security analysis results for Apps which are received from communication devices.

Upon detecting that there is a need for installing a specific App, a communication device 1000 transmits a database security analysis result request message, which requests a database security analysis result for the specific App, to the server 1010 at operation 1011.

If the database security analysis result for the specific App is stored, the server 1010 transmits the database security analysis result for the specific App to the communication device 1000.

The communication device 1000 receives the database security analysis result for the specific App from the server 1010, and outputs the received database security analysis result. Here, the communication device 1000 outputs the received database security analysis result, e.g., "Related App does not safely protect user personal information. Do you want to continue installation?" on a display, e.g., a touch screen, included in the communication device 1000.

The communication device 1000 outputs the database security analysis result for the specific App which the communication device 1000 intends to install, so that a user may determine whether to install the specific App by considering the database security analysis result for the specific App.

If the database security analysis result for the specific App is not stored, the server 1010 transmits a database security analysis result response message, which indicates that the database security analysis result for the specific App is not stored, to the communication device 1000 at operation 1013.

After receiving the database security analysis result response message from the server 1010, the communication device 1000 installs the specific App since the database security analysis result for the specific App is not stored in the server 1010 at operation 1015. The communication device 1000 performs a database security analyzing operation for the specific App and transmits a database security analysis result for the specific App to the server 1010 after completing the database security analyzing operation at operation 1017.

The server 1010 receives the database security analysis result for the specific App from the communication device 1000 and stores the database security analysis result for the specific App.

A process of transmitting and receiving a message between a communication device and a server in a case that a database security analyzing operation for an App is performed in the communication device in a communication system according to an embodiment of the present disclosure has been described with reference to FIG. 10, and a process of performing a database security analyzing operation for an App after installing the App in a communication device in a communication system according to an embodiment of the present disclosure will be described with reference to FIG. 11.

Figure 11:
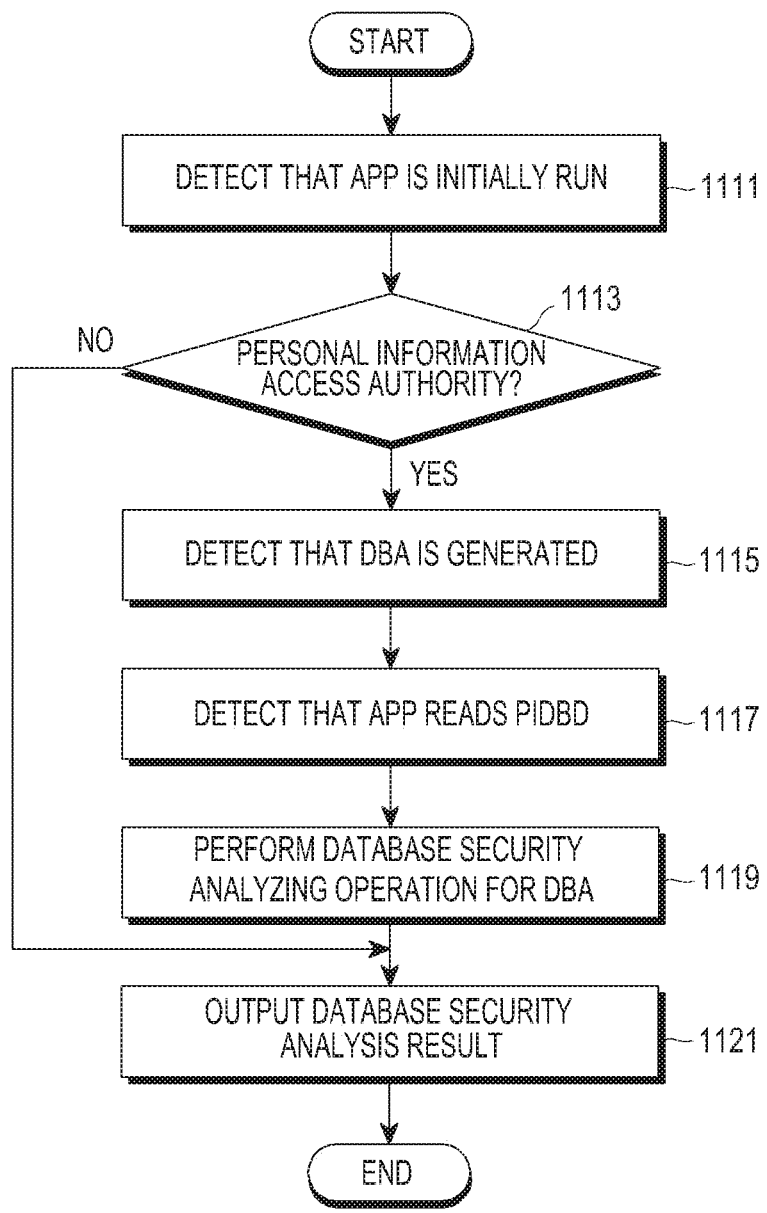
FIG. 11 schematically illustrates a process of performing a database security analyzing operation for an App after installing the App in a communication device in a communication system according to an embodiment of the present disclosure.

FIG. 11 schematically illustrates a process of performing a database security analyzing operation for an App after installing the App in a communication device in a communication system according to an embodiment of the present disclosure.

Referring to FIG. 11, a communication device detects that an App is initially run after the App is installed at operation 1111. The communication device determines whether a personal information access authority related to an access to personal information is included in authorities which are requested by the App at operation 1113. If the personal information access authority is not included in the authorities which are requested by the App, the communication proceeds to operation 1121.

If the personal information access authority is included in the authorities which are requested by the App, the communication device detects that a DBA is generated at operation 1115. The DBA may be generated in a case that the App is installed on the communication device, a case that the App is initially run after the App is installed, or a case that a database read/write operation on the App occurs. Further, if the DBA is not generated after the App reads a PIDBD, the communication device may detect that the App does not generate the database for the App.

Here, the communication device performs a scanning operation for a file path on which the App is installed, and may determine whether the DBA for an entire file system of the communication device is generated if the DBA is not generated.

The communication device detects that the App reads a PIDBD at operation 1117. The communication device performs a database security analyzing operation for the DBA at operation 1119. While the communication device performs the database security analyzing operation for the DBA, a running of a background process other than the App may be stopped in order to prevent a leak of personal information due to external risks.

The communication device outputs a database security analysis result at operation 1121, according to the database security analyzing operation, and transmits the database security analysis result to a server.

Although FIG. 11 illustrates a process of performing a database security analyzing operation for an App after installing an App in a communication device in a communication system according to an embodiment of the present disclosure, various changes could be made to FIG. 11. For example, although shown as a series of operations, various operations in FIG. 11 could overlap, occur in parallel, occur in a different order, or occur multiple times.

A process of performing a database security analyzing operation for an App after installing an App in a communication device in a communication system according to an embodiment of the present disclosure has been described with reference to FIG. 11, and a process performed in the database security analysis process 1119 in FIG. 11 will be described with reference to FIG. 12.

Figure 12:
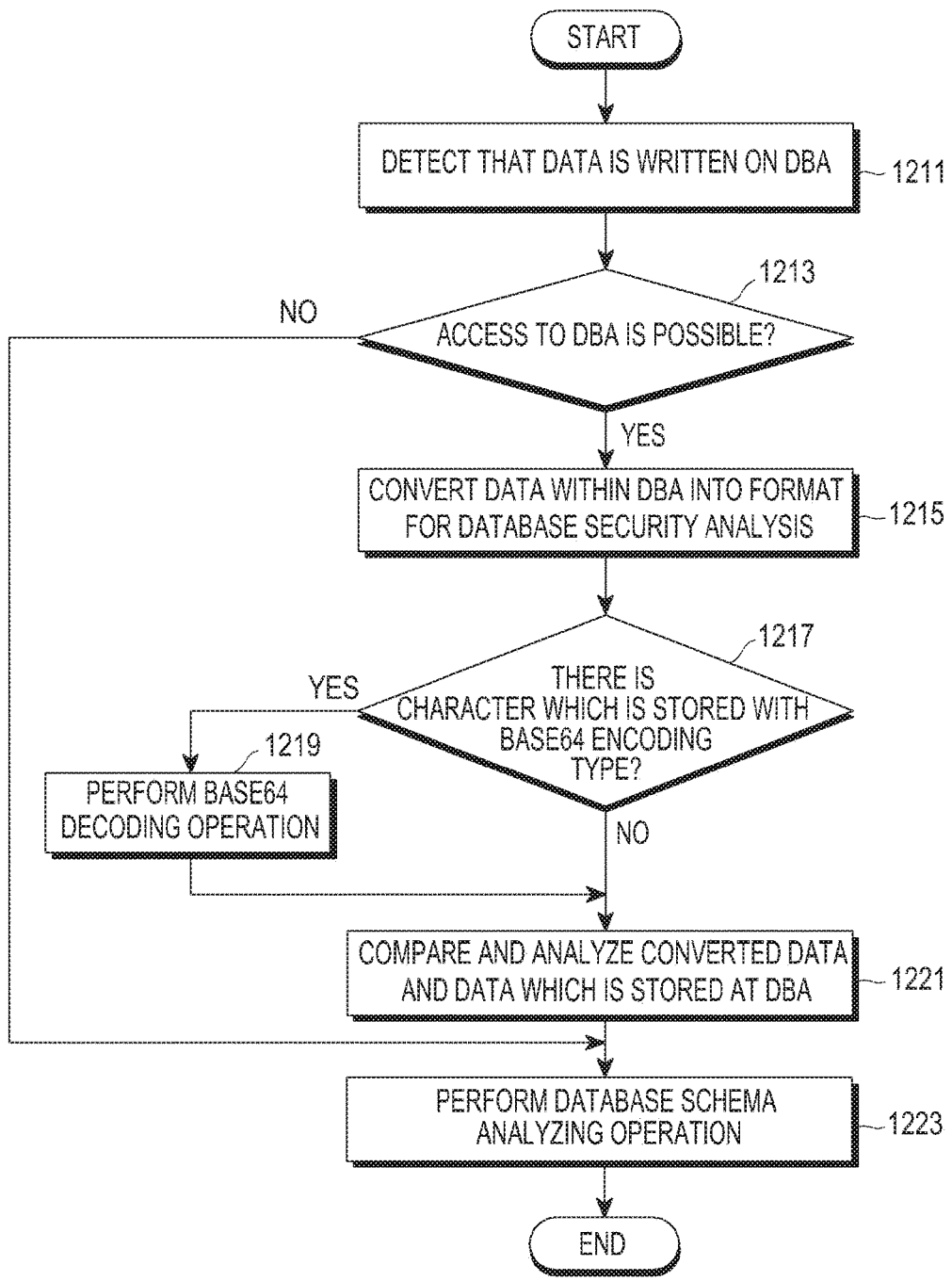
FIG. 12 schematically illustrates a process performed in a database security analysis process in FIG. 11 according to an embodiment of the present disclosure.

FIG. 12 schematically illustrates a process performed in the database security analysis process 1119 in FIG. 11 according to an embodiment of the present disclosure.

Referring to FIG. 12, a communication device detects that data is written on a DBA for a related App at operation 1211. The communication device determines whether access to the DBA is possible at operation 1213. If access to the DBA is impossible, the communication device terminates the database security analyzing operation for the DBA. Here, if access to the DBA is impossible, it may mean that encryption is applied to the DBA, or that only an allowed device may access the DBA. Even though the DBA is exposed to a 3rd party, the 3rd party may not access the DBA if the 3rd party does not know a password for the DBA or have an authority for the DBA, so it may be determined that a security level for the DBA is a safe level. As such, the communication device terminates the database security analyzing operation for the DBA.

If access to the DBA is possible, the communication device converts data within the DBA into a format for database security analysis at operation 1215. The communication device determines whether there is a character stored with a Base64 encoding type among the converted data at operation 1217. If there is a character stored with the Base64 encoding type, the communication device recovers original data by performing a Base64 decoding operation on the character stored with the Base64 encoding type at operation 1219. If there is no character stored with the Base64 encoding type, the communication device proceeds to operation 1221.

The communication device compares and analyzes the converted data and the data stored at the DBA at operation 1221. For example, the communication device compares and analyzes the converted data and the data stored at the DBA in order to detect which amount of personal information, which may be plaintext, is stored at the DBA using a data comparing scheme such as pattern matching, and the like.

Further, in a situation that it is difficult to correctly detect an attribute of matched data only using character stream comparison, a database security analyzing operation may be performed based on a scoring scheme. For example, if only an operation of comparing a character stream is performed, a telephone column included in a DBA may be encrypted. However, if a telephone number among message contents to which an encryption is not applied is stored in a form of plaintext, it may be misjudged that the telephone column is not safe.

The communication device performs a database schema analyzing operation on the compared and analyzed data at operation 1223. The database schema analyzing operation will be described with reference to FIG. 13, and therefore a detailed description will be omitted herein.

Although FIG. 12 illustrates a process performed in the database security analysis process 1119 in FIG. 11, various changes could be made to FIG. 12. For example, although shown as a series of operations, various operations in FIG. 12 could overlap, occur in parallel, occur in a different order, or occur multiple times.

A process performed in the database security analysis process 1119 in FIG. 11 has been described with reference to FIG. 12, and a process of analyzing a database schema in a communication system according to an embodiment of the present disclosure will be described with reference to FIG. 13.

Figure 13:
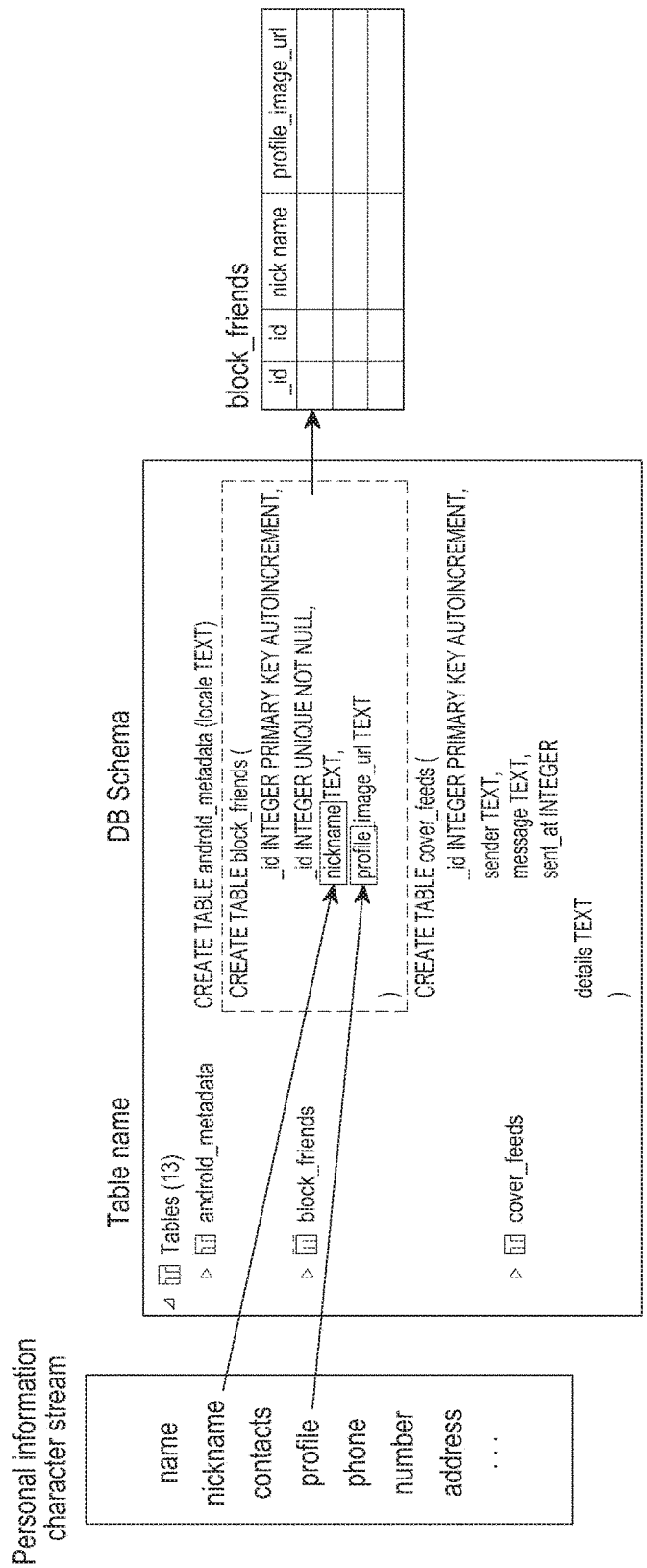
FIG. 13 schematically illustrates a process of analyzing a database schema in a communication system according to an embodiment of the present disclosure.

FIG. 13 schematically illustrates a process of analyzing a database schema in a communication system according to an embodiment of the present disclosure.

Referring to FIG. 13, as described in FIG. 12, a database schema analyzing operation may be performed after data stored at a DBA and data stored at a PIDBD are compared and analyzed.

The database schema includes a table name, a column name, a column type, and the like, and the communication device may correctly detect whether there is a column which manages personal information, or a table configuration using the database schema.

In an embodiment of the present disclosure, the communication device uses a personal information character stream set, which the communication device previously configures, and a personal information text stream set, which may include various texts that may be related to personal information such as 'name', 'profile image', 'phone', 'number', 'address', and the like.

As such, if a text included in the personal information character stream set is detected from data stored at the DBA, the communication device may extract a sentence in which a related text is included, and analyze a table structure, column information, and/or the like of the DBA from the extracted sentence.

Therefore, the communication device may collect specific information on which type of personal information is dangerous for security purposes in a related App using this database schema analysis result.

A process of analyzing a database schema in a communication system according to an embodiment of the present disclosure has been described with reference to FIG. 13, and an operating process of communication devices in a case that a security policy for a database, which each 3rd party App manages, is differently applied to the communication devices in a communication system according to an embodiment of the present disclosure will be described with reference to FIG. 14.

Figure 14:
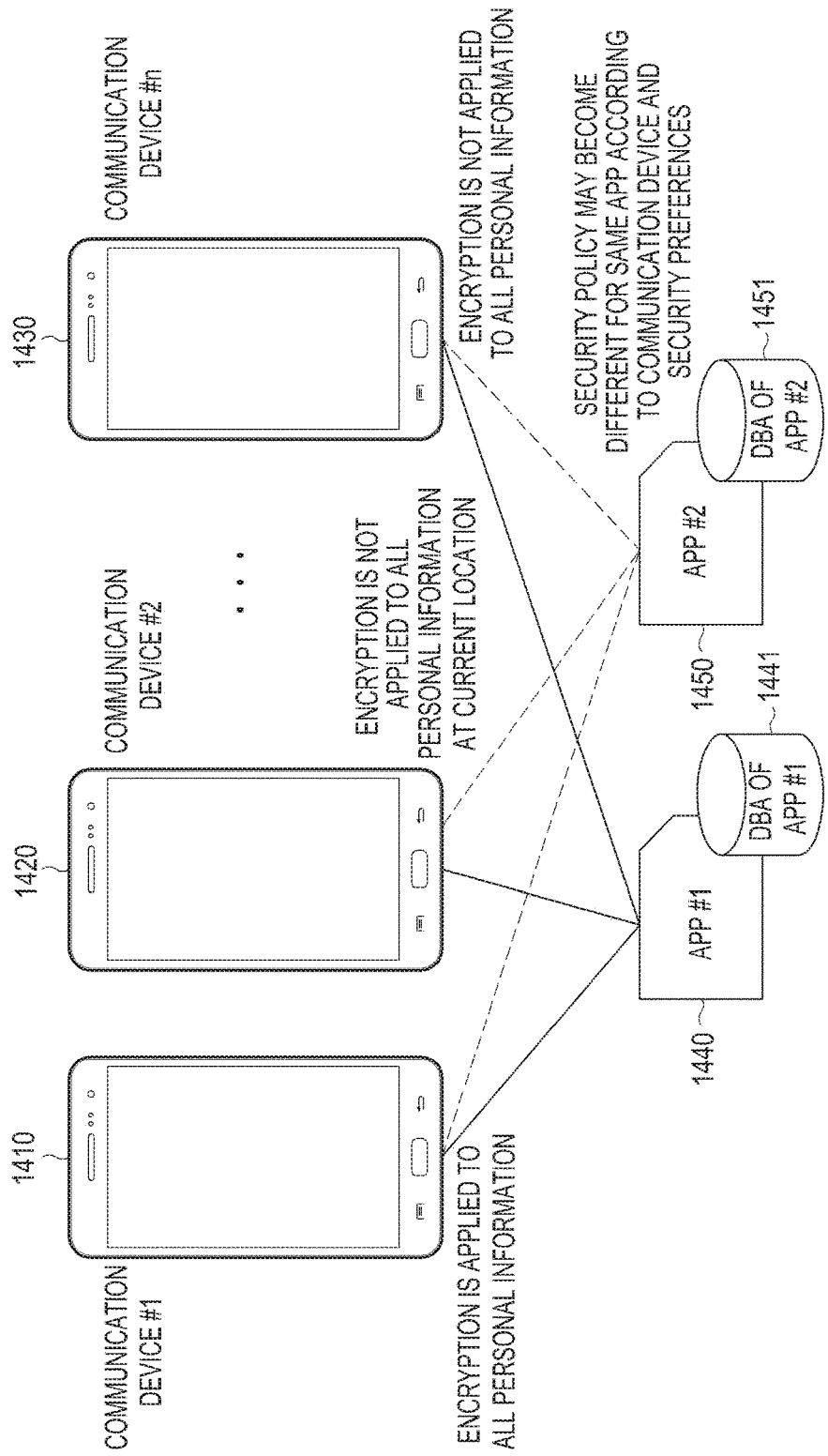
FIG. 14 schematically illustrates an operating process of communication devices in a case that a security policy for a database which each 3rd party App manages, is differently applied to the communication devices in a communication system according to an embodiment of the present disclosure.

FIG. 14 schematically illustrates an operating process of communication devices in a case that a security policy for a database, which each 3rd party App manages, is differently applied to the communication devices in a communication system according to an embodiment of the present disclosure.

In FIG. 14, it will be assumed that encryption is applied to contact information among information which is stored in a database 1441 for the 3rd party App #1 1440, and encryption is applied to all personal information among information which is stored in a database 1451 for the 3rd party App #2 1450.

Referring to FIG. 14, it will be noted that an operating process of communication devices in FIG. 14 is an operating process of communication devices in a case that a plurality of Apps, e.g., a 3rd party App #1 1440 and a 3rd party App #2 1450, are installed on each of a plurality of communication devices, e.g., n communication devices, e.g., a communication device #1 1410, a communication device #2 1420, . . . , a communication device #n 1430, and different database security policies are applied to the communication devices on which each of the 3rd party App #1 1440 and the 3rd party App #2 1450 is installed.

In FIG. 14, a database security policy may be differently applied to the same 3rd party App by considering various parameters, and this will be described below.

Firstly, a case that a database security policy is applied to a 3rd party App based on a security level which is set on a communication device will be described below.

If the 3rd party App #1 1440 is installed on each of the communication device #1 1410, the communication device #2 1420, . . . , the communication device #n 1430, a database security policy may be differently set for a DBA of the 3rd party App #1 1440 in each of the communication device #1 1410, the communication device #2 1420, . . . , the communication device #n 1430. For example, it will be assumed that the communication device #1 1410 sets a security level to a security level #1, which is equal to or higher than a security class #1, the communication device #2 1420 sets a security level to a security level #2, which is lower than the security class #1, and is equal to or higher than a security class #2, and the communication device #n 1430 sets a security level to a security level #3, which is lower than the security class #2. The security level #1 may be a security level in which encryption is applied to all personal information included in a DBA, the security level #2 may be a security level in which it is determined, if necessary, whether to encrypt all personal information included in the DBA, and the security level #3 may be a security level in which encryption is not applied to all personal information included in the DBA.

It will be assumed that the communication device #2 1420 previously sets specific locations to safe locations, and does not apply encryption for DBAs in the safe locations. In FIG. 14, it will be assumed that a priority, which is based on a location, is higher than a priority based on a security level set in a related communication device.

Therefore, even though the same App, i.e., the 3rd party App #1 1440, is equally installed on each of the communication device #1 1410, the communication device #2 1420, and the communication device #n 1430, a database security policy for the 3rd party App #1 1440 may be different in each of the communication device #1 1410, the communication device #2 1420, and the communication device #n 1430. For example, the communication device #1 1410 applies encryption to all personal information stored in the DBA 1441 of the 3rd party App #1 1440 since a security level is a security level #1, the communication device #2 1420 does not apply encryption to all personal information stored in the DBA 1441 of the 3rd party App #1 1440 since the communication device #2 1420 exists at a safe location even though a security level is a security level #2, and the communication device #n 1430 does not apply encryption to all personal information stored in the DBA 1441 of the 3rd party App #1 1440 since a security level is a security level #3.

As described in FIG. 14, it will be understood that a database security policy for a DBA of a related App may be differently applied to the same App based on various parameters.

An operating process of communication devices in a case that a security policy for a database, which each 3rd party App manages, is differently applied to the communication devices in a communication system according to an embodiment of the present disclosure has been described with reference to FIG. 14, and a process of transmitting and receiving a message between a communication device and a server in a case that a database security policy for an App is changed in a communication system according to an embodiment of the present disclosure will be described with reference to FIG. 15.

Figure 15:
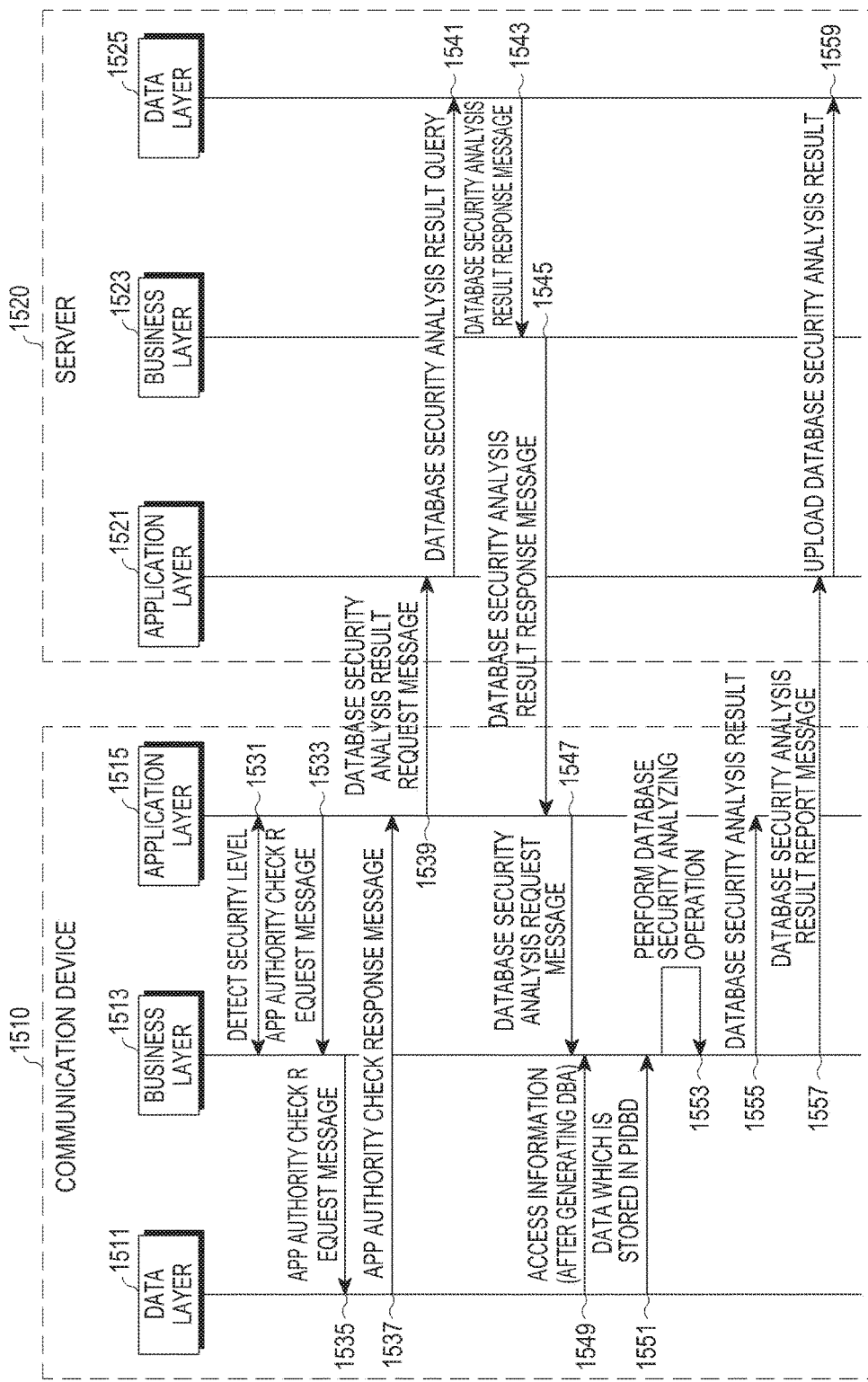
FIG. 15 schematically illustrates a process of transmitting and receiving a message between a communication device and a server in a case that a database security policy for an App is changed in a communication system according to an embodiment of the present disclosure.

FIG. 15 schematically illustrates a process of transmitting and receiving a message between a communication device and a server in a case that a database security policy for an App is changed in a communication system according to an embodiment of the present disclosure.

Referring to FIG. 15, the communication system includes a communication device 1510 and a server 1520.

The communication device 1510 includes a data layer 1511, a business layer 1513, and an App layer 1515. The business layer 1513 may be an App framework.

The server 1520 includes an App layer 1521, a business layer 1523, and a data layer 1525.

Upon detecting that there is a need for detecting a security level, which is set in the communication device 1510, the App layer 1515 in the communication device 1510 communicates with the business layer 1513 in the communication device 1510 to detect the security level set in the communication device 1510 at operation 1531.

After detecting the security level set in the communication device 1510, the App layer 1515 in the communication device 1510 transfers an App authority check request message, which requests to check an authority for an installed App, to the business layer 1513 in the communication device 1510 at operation 1533. Upon receiving the App authority check request message from the App layer 1515 in the communication device 1510, the business layer 1513 in the communication device 1510 transfers an App authority check request message, which requests to check the authority for the installed App, to the data layer 1511 in the communication device 1510 at operation 1535.

After receiving the App authority check request message from the business layer 1513 in the communication device 1510, the data layer 1511 in the communication device 1510 detects the authority for the App, and transfers an App authority response message, which includes information on the detected authority, to the App layer 1515 in the communication device 1510 at operation 1537. After receiving the App authority response message from the data layer 1511 in the communication device 1510, the App layer 1515 in the communication device 1510 transmits a database security analysis result request message, which requests a database security analysis result for the App, to the App layer 1521 in the server 1520 at operation 1539.

After receiving the database security analysis result request message from the App layer 1515 in the communication device 1510, the App layer 1521 in the server 1520 transfers a database security analysis result query to the data layer 1525 in the server 1520 at operation 1541. After receiving the database security analysis result query from the App layer 1521 in the server 1520, the data layer 1525 in the server 1520 determines whether the data layer 1525 in the server 1520 stores a database security analysis result for an App corresponding to the database security analysis result query.

If the data layer 1525 in the server 1520 does not store the database security analysis result, the data layer 1525 in the server 1520 transmits a database security analysis result response message, which indicates that there is no database security analysis result, to the business layer 1523 in the server 1520 at operation 1543. Upon receiving the database security analysis result response message from the data layer 1525 in the server 1520, the business layer 1523 in the server 1520 transmits a database security analysis result response message, which indicates that there is no database security analysis result, to the App layer 1515 in the communication device 1510 at operation 1545.

After receiving the database security analysis result response message from the business layer 1523 in the server 1520, the App layer 1515 in the communication device 1510 transfers a database security analysis request message, which requests to perform a database security analyzing operation for the installed App, to the business layer 1513 in the communication device at operation 1547.

The data layer 1511 in the communication device 1510 generates a database for the installed App, and detects access information to transfer the access information to the business layer 1513 in the communication device 1510 at operation 1549. The data layer 1511 in the communication device 1510 transfers data, which is stored in a PIDBD which the communication device 1510 manages, to the business layer 1513 in the communication device 1510 at operation 1551. Here, the PIDBD represents a database in which personal information, which is stored in a storage included in the communication device 1510, is stored.

Upon receiving the data which is stored in the PIDBD, the business layer 1513 in the communication device 1510 performs a database security analyzing operation for the data stored in the PIDBD at operation 1553, and transfers a database security analysis result, which is acquired according to performing the database security analyzing operation, to the App layer in the communication device 1510 at operation 1555. The business layer 1513 in the communication device 1510 transmits a database security analysis result report message, which includes the database security analysis result, to the App layer 1521 in the server 1520 at operation 1557.

Upon receiving the database security analysis result report message from the business layer 1513 in the communication device 1510, the App layer 1521 in the server 1520 uploads the database security analysis result to the data layer 1525 in the server 1520 at operation 1559.

Although FIG. 15 illustrates a process of transmitting and receiving a message between a communication device and a server in a case that a database security policy for an App is changed in a communication system according to an embodiment of the present disclosure, various changes could be made to FIG. 15. For example, although shown as a series of operations, various operations in FIG. 15 could overlap, occur in parallel, occur in a different order, or occur multiple times.

A process of transmitting and receiving a message between a communication device and a server in a case that a database security policy for an App is changed in a communication system according to an embodiment of the present disclosure has been described with reference to FIG. 15, and an example of a process of performing a database security analyzing operation for an App in a communication device in a case that a database security policy for the App is changed in a communication system according to an embodiment of the present disclosure will be described with reference to FIG. 16.

Figure 16:
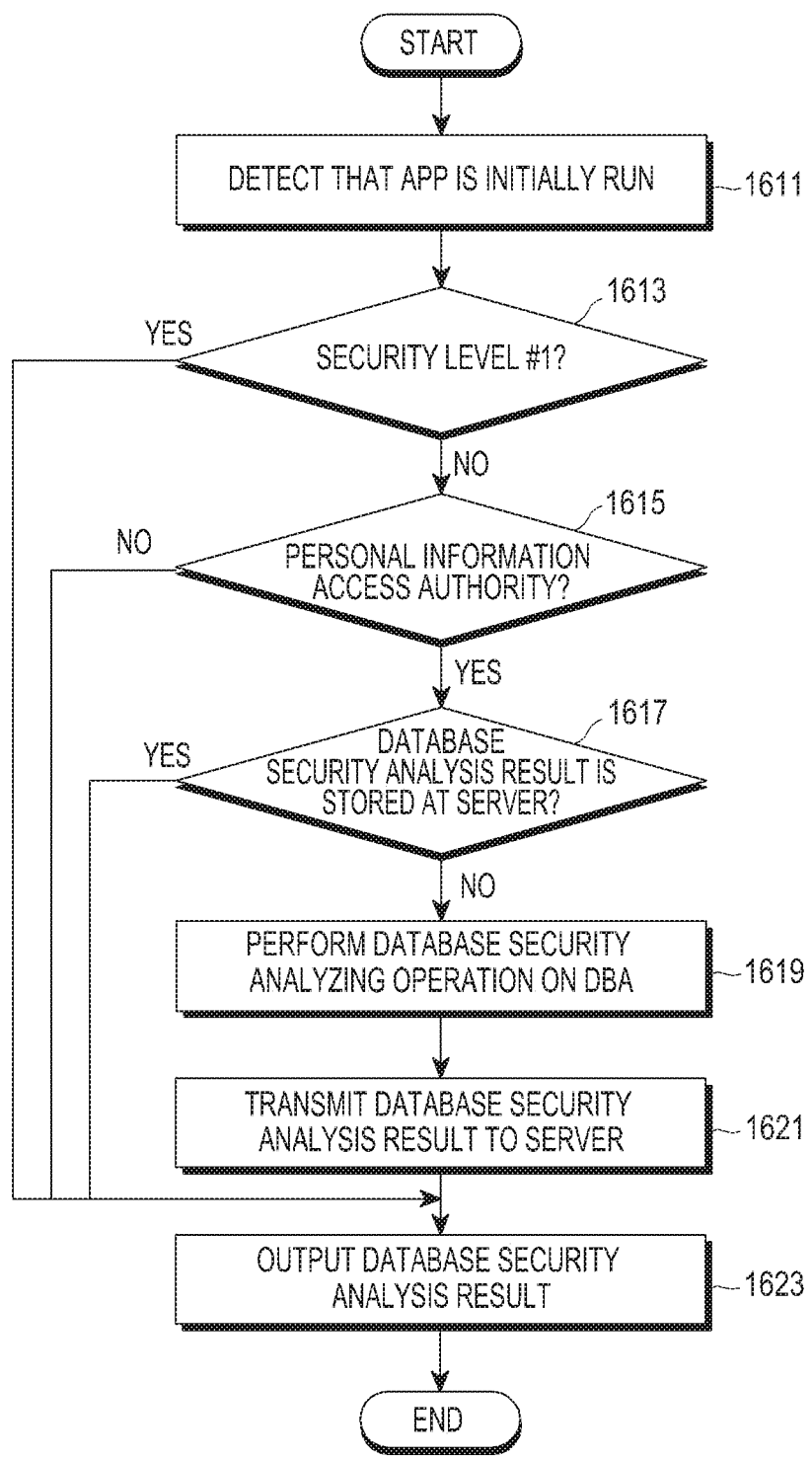
FIG. 16 schematically illustrates an example of a process of performing a database security analyzing operation for an App in a communication device in a case that a database security policy for the App is changed in a communication system according to an embodiment of the present disclosure.

FIG. 16 schematically illustrates an example of a process of performing a database security analyzing operation for an App in a communication device in a case that a database security policy for the App is changed in a communication system according to an embodiment of the present disclosure.

Referring to FIG. 16, a process of performing a database security analyzing operation for an App in FIG. 16 is a process of performing a database security analyzing operation for an App in a case that a security level may be differently set per communication device in a communication system.

A communication device detects that an App is initially run after the App is installed at operation 1611. The communication device determines whether a security level, which is previously set on the communication device, is a security level #1 in which encryption is applied to all personal information stored in a DBA at operation 1613. If the security level previously set on the communication device is the security level #1, the communication device proceeds to operation 1623. In the security level #1, the encryption is applied to all personal information stored in the DBA, so the communication device determines that there is no need for performing a database security analyzing operation for the DBA. As such, if the security level previously set on the communication device is the security level #1, the communication device does not perform an operation related to the database security analyzing operation any further, and proceeds to operation 1623.

If the security level previously set on the communication device is not the security level #1, the communication device determines whether a personal information access authority, related to an access to personal information, is included in authorities which are requested on the App at operation 1615. If the personal information access authority is not included in the authorities which are requested on the App, the communication device proceeds to operation 1623.

If the personal information access authority is included in the authorities which are requested on the App, the communication device determines whether a database security analysis result for the security level, which is set in the communication device, is stored in a server at operation 1617. If the database security analysis result for the security level, which is set in the communication device, is stored in the server, the communication device proceeds to operation 1623.

If the database security analysis result for the security level, which is set in the communication device, is not stored in the server, the communication device performs a database security analyzing operation for the DBA at operation 1619. While the communication device performs the database security analyzing operation for the DBA, a running of a background process other than the App may be stopped in order to prevent a leak of personal information due to external risks.

The communication device transmits a database security analysis result according to the database security analyzing operation to the server at operation 1621. The communication device outputs the database security analysis result according to the database security analyzing operation at operation 1623.

As described in FIG. 16, in an embodiment of the present disclosure, if a security level is set to a security level lower than a threshold security level, e.g., a security level #1, a communication device acquires a database security analysis result for a related App by receiving the database security analysis result for the related App from a server or performing a database security analyzing operation for the related App.

Although FIG. 16 illustrates an example of a process of performing a database security analyzing operation for an App in a communication device in a case that a database security policy for the App is changed in a communication system according to an embodiment of the present disclosure, various changes could be made to FIG. 16. For example, although shown as a series of operations, various operations in FIG. 16 could overlap, occur in parallel, occur in a different order, or occur multiple times.

An example of a process of performing a database security analyzing operation for an App in a communication device in a case that a database security policy for the App is changed in a communication system according to an embodiment of the present disclosure has been described with reference to FIG. 16, and another example of a process of performing a database security analyzing operation for an App in a communication device in a case that a database security policy for the App is changed in a communication system according to an embodiment of the present disclosure will be described with reference to FIG. 17.

Figure 17:
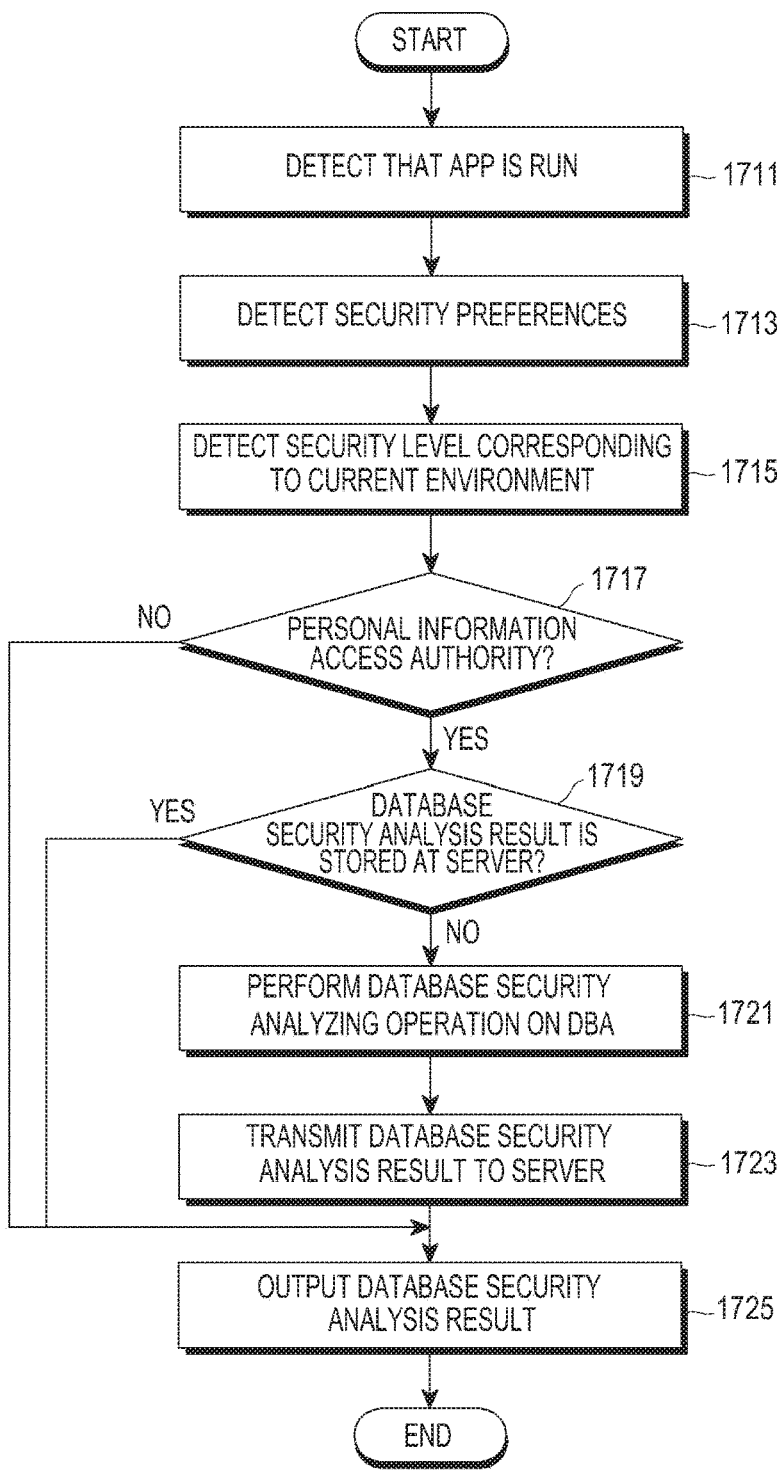
FIG. 17 schematically illustrates another example of a process of performing a database security analyzing operation for an App in a communication device in a case that a database security policy for the App is changed in a communication system according to an embodiment of the present disclosure.

FIG. 17 schematically illustrates another example of a process of performing a database security analyzing operation for an App in a communication device in a case that a database security policy for the App is changed in a communication system according to an embodiment of the present disclosure.

Referring to FIG. 17, a process of performing a database security analyzing operation for an App in FIG. 17 is a process of performing a database security analyzing operation for an App in a case that a security level may be differently set according to security preferences.

A communication device detects that an App is run at operation 1711. The communication device detects security preferences previously set in the communication device at operation 1713. The communication device detects a current environment, such as a location at which the communication device exists, current time, and the like, and detects a security level corresponding to the detected current environment at operation 1715.

The communication device determines whether a personal information access authority, related to an access to personal information, is included in authorities which are requested on the App at operation 1717. If the personal information access authority is not included in the authorities which are requested on the App, the communication device proceeds to operation 1725.

If the personal information access authority is included in the authorities which are requested on the App, the communication device determines whether a database security analysis result for the security level corresponding to the current environment is stored in a server at operation 1719. If the database security analysis result for the security level is stored in the server, the communication device proceeds to operation 1725.

If the database security analysis result for the security level is not stored in the server, the communication device performs a database security analyzing operation for a DBA at operation 1721. While the communication device performs the database security analyzing operation for the DBA, a running of a background process other than the App may be stopped in order to prevent a leak of personal information due to external risks.

The communication device transmits a database security analysis result according to the database security analyzing operation to the server at operation 1723. The communication device outputs the database security analysis result according to the database security analyzing operation at operation 1725.

As described in FIG. 17, in an embodiment of the present disclosure, a communication device acquires a database security analysis result for a related App by receiving the database security analysis result for the related App from a server or performing a database security analyzing operation for the related App, according to security preferences of the communication device.

Although FIG. 17 illustrates another example of a process of performing a database security analyzing operation for an App in a communication device in a case that a database security policy for the App is changed in a communication system according to an embodiment of the present disclosure, various changes could be made to FIG. 17. For example, although shown as a series of operations, various operations in FIG. 17 could overlap, occur in parallel, occur in a different order, or occur multiple times.

Another example of a process of performing a database security analyzing operation for an App in a communication device in a case that a database security policy for the App is changed in a communication system according to an embodiment of the present disclosure has been described with reference to FIG. 17, and an example of an operation of applying a security policy for a DBA in a communication system according to an embodiment of the present disclosure will be described with reference to FIG. 18.

Figure 18:
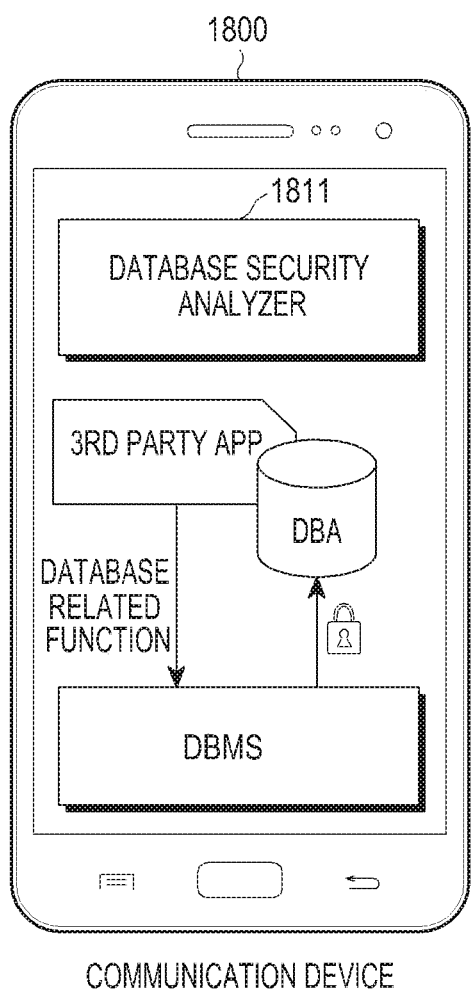
FIG. 18 schematically illustrates an example of an operation of applying a security policy to a database within application (DBA) in a communication system according to an embodiment of the present disclosure.

FIG. 18 schematically illustrates an example of an operation of applying a security policy to a DBA in a communication system according to an embodiment of the present disclosure.

Referring to FIG. 18, upon detecting that there is a need for applying a security policy to a DBA for a specific 3rd party App, a database security analyzer 1811 included in a communication device 1800 may apply the security policy to the DBA without changing the specific 3rd party App. Here, there may be various cases that the database security analyzer 1811 detects that there is the need for applying the security policy to the DBA for the specific 3rd party App, and a detailed description will be omitted herein.

An operation of applying the security policy to the DBA for the specific 3rd party App in the database security analyzer 1811 will be described below.

Upon detecting that a paging occurs for a database related function, such as insert, delete, query, update, and the like, the database security analyzer 1811 determines which App that the database related function is paged from. If the database related function is paged from a 3rd party App of which a security level is set in the communication device 1800, the database security analyzer 1811 adds an encryption and decryption function to the database related function thereby applying a security policy to a database related operation which occurs in a related 3rd party App.

Similarly, if a security policy is applied to a DBA for a related App, the DBA for the related App may be safely protected without modifying the related App.

An example of an operation of applying a security policy to a DBA in a communication system according to an embodiment of the present disclosure has been described with reference to FIG. 18, and another example of an operation of applying a security policy to a DBA in a communication system according to an embodiment of the present disclosure will be described with reference to FIG. 19.

Figure 19:
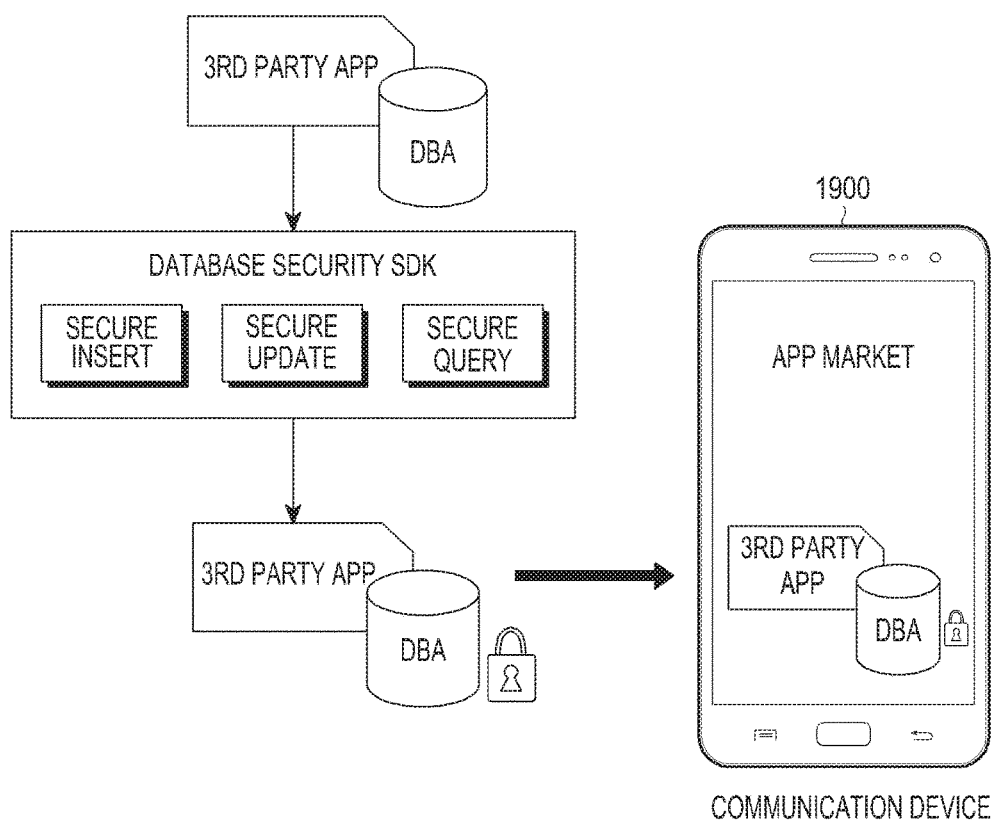
FIG. 19 schematically illustrates another example of an operation of applying a security policy to a DBA in a communication system according to an embodiment of the present disclosure.

FIG. 19 schematically illustrates another example of an operation of applying a security policy to a DBA in a communication system according to an embodiment of the present disclosure.

Referring to FIG. 19, an embodiment of the present disclosure provides an application program interface (API), which has a form equal to a general database related function, in order to easily apply a database security policy to a DBA for a 3rd party App.

For example, if an API, such as secureInsert, secureUpdate, secureDelete, secureQuery, and the like, of a software development kit (SDK) is paged instead of the general database related function, such as insert, update, delete, query, and the like, a database related function, which has the same database function and to which an encryption and decryption function is applied, is used.

Therefore, an App developer may apply a security policy to a DBA using the SDK even though the App developer does not professionally understand an encryption function. If an App which is developed in this way is disseminated to a market, communication devices, such as communication device 1900, may use an App which uses a safe DBA.

Another example of an operation of applying a security policy to a DBA in a communication system according to an embodiment of the present disclosure has been described with reference to FIG. 19, and still another example of an operation of applying a security policy to a DBA in a communication system according to an embodiment of the present disclosure will be described with reference to FIG. 20.

Figure 20:
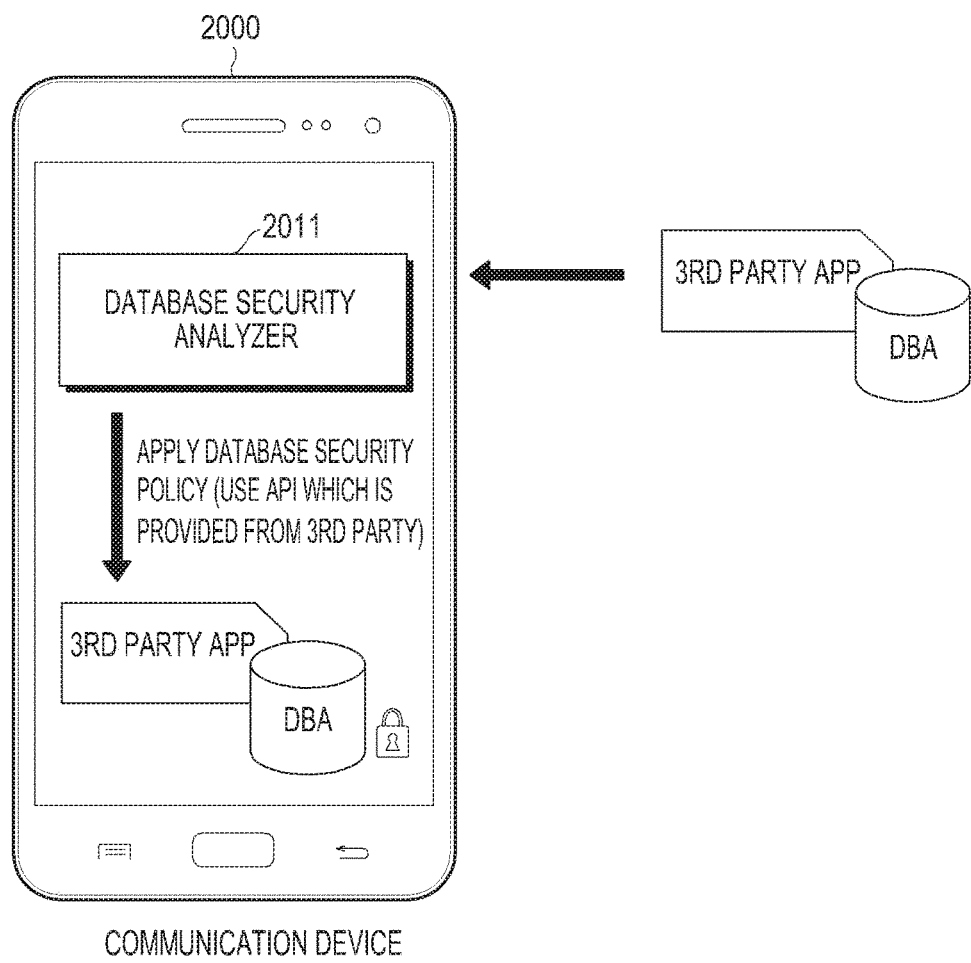
FIG. 20 schematically illustrates still another example of an operation of applying a security policy to a DBA in a communication system according to an embodiment of the present disclosure.

FIG. 20 schematically illustrates still another example of an operation of applying a security policy to a DBA in a communication system according to an embodiment of the present disclosure.

Referring to FIG. 20, a database security analyzer 2011 included in a communication device 2000 may make an agreement with a 3rd party in order to enhance security for a DBA, and the 3rd party may provide an API, in which the database security analyzer 2011 may access the DBA, to the database security analyzer 2011. The database security analyzer 2011 may apply encryption and decryption to data which a related DBA stores based on the API received from the third party.

Still another example of an operation of applying a security policy to a DBA in a communication system according to an embodiment of the present disclosure has been described with reference to FIG. 20, and an inner structure of a communication device in a communication system according to an embodiment of the present disclosure will be described with reference to FIG. 21.

Figure 21:
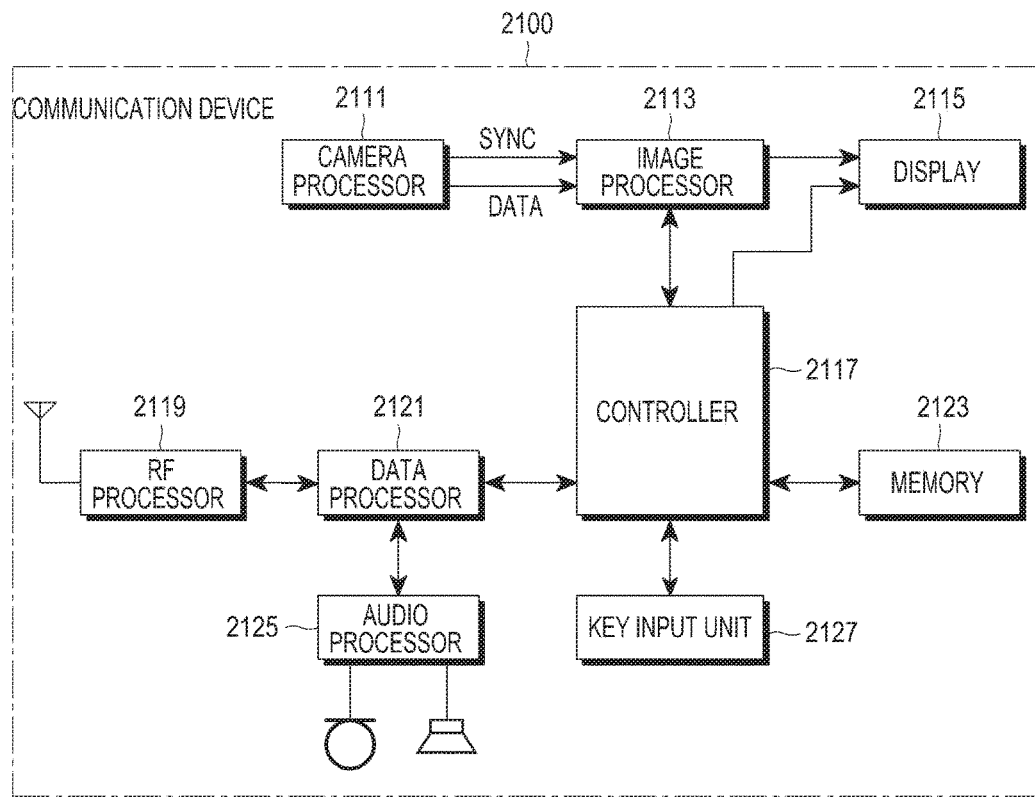
FIG. 21 schematically illustrates an inner structure of a communication device in a communication system according to an embodiment of the present disclosure.

FIG. 21 schematically illustrates an inner structure of a communication device in a communication system according to an embodiment of the present disclosure.

Referring to FIG. 21, a communication device 2100 may be connected with an external electronic device (not illustrated in FIG. 21) using at least one of a communication module, a connector, and an earphone connecting jack. The external electronic device may include one of various devices which are removable from the communication device 2100 and are connectible with the communication device 2100 in a wired manner, such as, for example, an earphone, an external speaker, a universal serial bus (USB) memory, a charging device, a cradle/dock, a digital multimedia broadcasting (DMB) antenna, a mobile payment-related device, a health management device (a blood pressure monitor or the like), a game console, a vehicle navigation device, and so forth.

The external electronic device may also be one of a wirelessly connectible Bluetooth communication device, a near field communication (NFC) device, a Wi-Fi Direct communication device, a wireless access point (AP), etc. The communication device 2100 may be connected with a server or another communication device such as, for example, one of a cellular phone, a smart phone, a tablet PC, a desktop PC, and a server, in a wired or wireless manner.

The communication device 2100 may include a camera processor 2111, an image processor 2113, a display 2115, a controller 2117, a radio frequency (RF) processor 2119, a data processor 2121, a memory 2123, an audio processor 2125, and a key input unit 2127.

The RF processor 2119 may be responsible for radio communication of the communication device 2100. The RF processor 2119 may include a RF transmitter for frequency up-converting transmission signals and amplifying the up-converted signals, and a RF receiver for low-noise-amplifying received signals and frequency down-converting the amplified signals.

The data processor 2121 may include a transmitter for encoding and modulating the transmission signals, and a receiver for demodulating and decoding the received signals. In other words, the data processor 2121 may include a modulator/de-modulator (MODEM) and a coder/decoder (CODEC). The CODEC may include a data CODEC for processing packet data, and an audio CODEC for processing audio signals such as voice.

The audio processor 2125 may play received audio signals output from the audio CODEC in the data processor 2121 using a speaker, and may transfer transmission audio signals picked up by a microphone to the audio CODEC in the data processor 2121.

The key input unit 2127 may include numeric/character keys for inputting numeric and character information and function keys for setting various functions.

The memory 2123 may include a program memory, a data memory, and the like. The program memory may store programs for controlling the general operation of the communication device 2100. In accordance with an embodiment to the present disclosure, the memory 2123 may store programs related to an operation of protecting information. The data memory may temporarily store the data generated during execution of these programs.

The memory 2123 may be implemented as an arbitrary data storing device such as a read only memory (ROM), a random access memory (RAM), and a memory card (for example, a secure digital (SD) card, and a memory stick). The memory 2123 may include a non-volatile memory, a volatile memory, a hard disk drive (HDD), or a solid state drive (SSD).

The memory 2123 may also store applications of various functions such as navigation, video communication, games, an alarm application based on time, images for providing a graphic user interface (GUI) related to the applications, user information, documents, databases or data related to a method for processing touch inputs, background images (for example, a menu screen, a standby screen, and so forth), operation programs necessary for driving the communication device 2100, and images captured by the camera processor 2111.

The memory 2123 may be a media which is read through a machine, e.g., a computer. Here, the term "machine-readable medium" includes a medium for providing data to the machine to allow the machine to execute a particular function. The memory 2123 may include non-volatile media and volatile media. Such a medium needs to be of a tangible type so that commands delivered to the medium can be detected by a physical tool that reads the commands using the machine.

The machine-readable medium may include, but is not limited to, at least one of a floppy disk, a flexible disk, a hard disk, a magnetic tape, a compact disc read-only memory (CD-ROM), an optical disk, a punch card, a paper tape, a RAM, a programmable read-only memory (PROM), an erasable programmable read-only memory (EPROM), and a flash-EPROM.

The controller 2117 may control the overall operation of the communication device 2100. The controller 2117 may perform an operation related to an operation of protecting information according to an embodiment of the present disclosure. The operation related to the operation of protecting the information according to an embodiment of the present disclosure may be performed in the manner described before with reference to FIGS. 3 to 20, and therefore a detailed description thereof will be omitted herein.

The camera processor 2111 may include a camera sensor for capturing images and converting the captured optical image signal into an electrical signal, and a signal processor for converting the analog image signal captured by the camera sensor into digital data. The camera sensor may be assumed to be a charge-coupled device (CCD) or complementary metal-oxide-semiconductor (CMOS) sensor, and the signal processor may be implemented with a digital signal processor (DSP). The camera sensor and the signal processor may be implemented either in an integrated way, or in a separated way.

The image processor 2113 performs image signal processing (ISP) for displaying the image signals output from the camera processor 2111 on the display 2115. The ISP may include gamma correction, interpolation, spatial variations, image effects, image scaling, automatic white balance (AWB), automatic exposure (AE), and automatic focus (AF). The image processor 2113 processes the image signals output from the camera processor 2111 on a frame-by-frame basis, and outputs the frame image data according to the characteristics and size of the display 2115.

The image processor 2113 may include a video codec, which compresses the frame image data displayed on the display 2115 by a preset coding scheme, and decompresses the compressed frame image data into the original frame image data. The video codec may include a joint photographic experts group (JPEG) codec, a moving picture experts group 4 (MPEG4) codec, and a Wavelet codec. The image processor 2113 is assumed to have an on-screen display (OSD) function, and may output OSD data according to a size of the displayed screen, under control of the controller 2117.

The display 2115 may display, on its screen, image signals output from the image processor 2113 and user data output from the controller 2117. The display 2115 may include a liquid crystal display (LCD). In this case, the display 2115 may include an LCD controller, a memory capable of storing image data, and an LCD panel. When implemented in a touch screen manner, the LCD may serve as an input unit. In this case, keys of the key input unit 2127 may be displayed on the display 2115.

If the display 2115 is implemented as the touch screen, the display 2115 outputs an analog signal, which corresponds to at least one input to a user graphic interface, to the controller 2117.

The display 2115 may receive at least one user input through a user's body (for example, a finger including a thumb) or the key input unit 2127 (for example, a stylus pen or an electronic pen).

The display 2115 may receive continuous motions on one touch (for example, a drag). The display 2115 may output an analog signal corresponding to the continuous motions to the controller 2117.

In an embodiment of the present disclosure, a touch may also include a non-contact touch (for example, when the user input means is positioned within a distance of, for example, 1 cm) in which the user input means may be detected without directly contacting the display 2115. The touch may also include a direct contact between the display 2115 and a finger or the key input unit 2127. A distance or interval from the display 2115 within which the user input means may be detected may be changed according to the capability or structure of the communication device 2100. In particular, to separately detect a direct touch event based on a contact with the user input means and an indirect touch event (that is, a hovering event), the display 2115 may be configured to output different values for values (for example, an analog voltage value or current value) detected in the direct touch event and the hovering event.

The display 2115 may be implemented as, for example, a resistive type, a capacitive type, an infrared type, an acoustic wave type, or a combination thereof.

The display 2115 may include at least two touch panels capable of sensing a touch, an approach of a finger, or the key input unit 2127 to receive inputs generated by the finger or the key input unit 2127. The at least two touch panels provide different output values to the controller 2117. Thus, the controller 2117 differently recognizes the values input from the at least two touch screen panels to identify whether the input from the display 2115 is the input generated by the finger or by the key input unit 2127.

The controller 2117 may convert the analog signal received from the display 2115 into a digital signal and control the display 2115 using the digital signal. For example, the controller 2117 may control a shortcut icon (not illustrated in FIG. 21) displayed on the display 2115 to be selected or executed in response to a direct touch event or a hovering event.

The controller 2117, by detecting a value (for example, an electric-current value) output through the display 2115, may recognize a hovering interval or distance as well as a user input position and convert the recognized distance into a digital signal (for example, a Z coordinate). The controller 2117 may also, by detecting the value output through the display 2115, detect a pressure applied by the user input means to the display 2115, and convert the detected pressure into a digital signal.

While the camera processor 2111, the image processor 2113, the display 2115, the controller 2117, the RF processor 2119, the data processor 2121, the memory 2123, the audio processor 2125, and the key input unit 2127 are shown in FIG. 21 as separate units, it is to be understood that this is merely for convenience of description. In other words, two or more of the camera processor 2111, the image processor 2113, the display 2115, the controller 2117, the RF processor 2119, the data processor 2121, the memory 2123, the audio processor 2125, and the key input unit 2127 may be incorporated into a single unit.

Alternatively, the communication device 2100 may be implemented with one processor.

An inner structure of a communication device in a communication system according to an embodiment of the present disclosure has been described with reference to FIG. 21, and an inner structure of a server in a communication system according to an embodiment of the present disclosure will be described with reference to FIG. 22.

Figure 22:
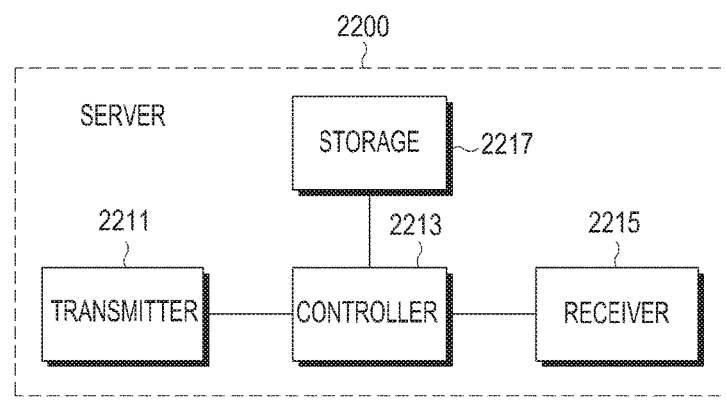
FIG. 22 schematically illustrates an inner structure of a server in a communication system according to an embodiment of the present disclosure.

FIG. 22 schematically illustrates an inner structure of a server in a communication system according to an embodiment of the present disclosure.

Referring to FIG. 22, a server 2200 includes a transmitter 2211, a controller 2213, a receiver 2215, and a storage unit 2217.

The controller 2213 may control the overall operation of the server 2200. More particularly, the controller 2213 may control the server 2200 to perform an operation related to an operation of protecting information according to an embodiment of the present disclosure. The operation related to the operation of protecting information according to an embodiment of the present disclosure may be performed in the manner described with reference to FIGS. 3 to 20, and a description thereof will be omitted herein.

The transmitter 2211 may transmit various signals and various messages, and the like, to communication nodes, and the like, included in the communication system under control of the controller 2213. The various signals, the various messages, and the like, transmitted in the transmitter 2211 have been described in FIGS. 3 to 20 and a description thereof will be omitted herein.

The receiver 2215 may receive various signals, various messages, and the like, from communication nodes included in the communication system under control of the controller 2213. The various signals, the various messages, and the like, received in the receiver 2215 have been described in FIGS. 3 to 20 and a description thereof will be omitted herein.

The storage unit 2217 may store a program related to an operation of protecting information, according to an embodiment of the present disclosure, which the server 2200 performs under control of the controller 2213, various data, and the like.

The storage unit 2217 may store the various signals and the various messages which the receiver 2215 receives from the communication nodes, and the like.

While the transmitter 2211, the controller 2213, the receiver 2215, and the storage unit 2217 are described in the server 2200 as separate units, it is to be understood that this is merely for convenience of description. In other words, two or more of the transmitter 2211, the controller 2213, the receiver 2215, and the storage unit 2217 may be incorporated into a single unit. The server 2200 may be implemented with one processor.

As is apparent from the foregoing description, an embodiment of the present disclosure enables to protect information in a communication system.

An embodiment of the present disclosure enables to protect information based on a database security analysis result for an App in a communication system.

An embodiment of the present disclosure enables to dynamically protect information based on a database security analysis result for an App in a server in a communication system.

An embodiment of the present disclosure enables to dynamically protect information based on a database security analysis result for an App in a communication device in a communication system.

An embodiment of the present disclosure enables to dynamically protect information thereby enhancing security for a DBA per App in a communication system.

An embodiment of the present disclosure enables to dynamically protect information based on a database security analysis result for an App according to security preferences in a communication system.

Certain aspects of the present disclosure may also be embodied as computer readable code on a non-transitory computer readable recording medium. A non-transitory computer readable recording medium may be any data storage device that can store data, which can be thereafter read by a computer system. Examples of the non-transitory computer readable recording medium include ROM, RAM, compact disc (CD) ROMs (CD-ROMs), magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a CD, a digital versatile disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive a program from a program providing device, which is connected to the apparatus via a wired or a wireless manner, and store the program. The program providing device may include a memory for storing instructions, which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for protecting information in a mobile device in a communication system, the method comprising:
   in response to the mobile device detecting that an application will be installed in the mobile device or detecting that the application is being initially run by the mobile device, acquiring, by the mobile device, a database security analysis result of a database corresponding to application, the database security analysis result being a result of performing a database security analyzing operation for protecting the database; and
   outputting, on a display of the mobile device, the database security analysis result for the application,
   wherein the database is generated in the mobile device in response to installing the application, and
   wherein the database includes personal user information related to running the application.

2. The method of claim 1, wherein the acquiring of the database security analysis result for the application comprises:
   transmitting a database security analysis result request message, which requests the database security analysis result for the application, to a server; and
   receiving a database security analysis response message, which includes the database security analysis result for the application, from the server.

3. The method of claim 1, wherein the acquiring of the database security analysis result for the application comprises:
   transmitting a database security analysis result request message, which requests the database security analysis result for the application, to a server;
   receiving a database security analysis response message, which indicates that the database security analysis result for the application is not stored in the server, from the server; and
   performing the database security analyzing operation for the application to acquire the database security analysis result for the application.

4. The method of claim 3, wherein the performing of the database security analyzing operation for the application comprises:
- if a specific type of information access authority related to a specific type of information access is included in authorities which are requested in the application, detecting that the database for the application is generated;
- detecting that the application reads a specific type of information included in the database included in the mobile device; and
- performing the database security analyzing operation for the database to acquire the database security analysis result for the application.

5. The method of claim 1, further comprising:
- transmitting the database security analysis result for the application to a server.

6. A mobile device in a communication system, the mobile device comprising:
- a display; and
- a hardware processor configured to:
  - in response to detecting that an application will be installed in the mobile device or detecting that the application is being initially run by the mobile device, acquire a database security analysis result of a database corresponding to application, the database security analysis result being a result of performing a database security analyzing operation for protecting the database, and
  - control the display to output the database security analysis result for the application,
  - wherein the database is generated in the mobile device in response to installing the application, and
  - wherein the database includes personal user information related to running the application.

7. The mobile device of claim 6, wherein the hardware processor is further configured to:
- control the mobile device to transmit a database security analysis result request message, which requests the database security analysis result for the application, to a server; and
- control the mobile device to receive a database security analysis response message, which includes the database security analysis result for the application, from the server.

8. The mobile device of claim 6, wherein the hardware processor is further configured to:
- control the mobile device to transmit a database security analysis result request message, which requests the database security analysis result for the application, to a server;
- control the mobile device to receive a database security analysis response message, which indicates that the database security analysis result for the application is not available at the server, from the server; and
- perform the database security analyzing operation for the application to acquire the database security analysis result for the application.

9. The mobile device of claim 8, wherein the hardware processor is further configured to:
- if a specific type of information access authority related to a specific type of information access is included in authorities which are requested in the application, detect that the database for the application is generated;
- detect that the application reads a specific type of information included in the database included in the mobile device; and
- perform the database security analyzing operation for the database to acquire the database security analysis result for the application.

10. The mobile device of claim 6, wherein the hardware processor is further configured to control the mobile device to transmit the database security analysis result for the application to a server.

11. The method of claim 1, wherein the personal user information comprises at least one of system preferences, a searching record, an alarm, a Wi-Fi list, a picture, an image file, contact information, call history, a text message, a schedule, or an e-mail.

12. The mobile device of claim 6, wherein the personal user information comprises at least one of system preferences, a searching record, an alarm, a Wi-Fi list, a picture, an image file, contact information, call history, a text message, a schedule, or an e-mail.

* * * * *